United States Patent
Nagasaki et al.

(10) Patent No.: US 12,298,117 B2
(45) Date of Patent: May 13, 2025

(54) OPTICAL INTERFERENCE RANGE SENSOR

(71) Applicant: OMRON Corporation, Kyoto (JP)

(72) Inventors: Yusuke Nagasaki, Kyoto (JP);
Masayuki Hayakawa, Kyoto (JP);
Kazuya Kimura, Kyoto (JP)

(73) Assignee: OMRON Corporation, Kyoto (JP)

( * ) Notice: Subject to any disclaimer, the term of this patent is extended or adjusted under 35 U.S.C. 154(b) by 182 days.

(21) Appl. No.: 18/172,689

(22) Filed: Feb. 22, 2023

(65) Prior Publication Data

US 2023/0288188 A1  Sep. 14, 2023

(51) Int. Cl.
*G01B 11/02* (2006.01)
*G01B 9/02001* (2022.01)
*G01B 9/02015* (2022.01)

(52) U.S. Cl.
CPC ........ *G01B 11/026* (2013.01); *G01B 9/02007* (2013.01); *G01B 9/02027* (2013.01)

(58) Field of Classification Search
CPC .............. G01B 11/026; G01B 9/02007; G01B 9/02027; G01B 9/02019; G01B 9/02061; G01B 21/045; G01B 9/02004; G01D 5/35306; G01S 17/08; G01S 7/4811
See application file for complete search history.

(56) References Cited

U.S. PATENT DOCUMENTS

| | | | |
|---|---|---|---|
| 5,523,841 A | 6/1996 | Nara et al. | |
| 6,507,405 B1* | 1/2003 | Grek | G01B 9/02022 |
| | | | 356/497 |
| 7,499,180 B2* | 3/2009 | Hattori | G01B 9/02072 |
| | | | 356/510 |
| 8,174,705 B1 | 5/2012 | Coward et al. | |
| 2017/0276471 A1* | 9/2017 | Jiang | G01B 9/02044 |
| 2018/0039191 A1 | 2/2018 | Shibazaki | |
| 2020/0257209 A1 | 8/2020 | Shibazaki | |
| 2020/0309692 A1 | 10/2020 | Nakamura | |
| 2021/0148703 A1* | 5/2021 | Ohmuro | G01C 3/32 |

FOREIGN PATENT DOCUMENTS

| | | |
|---|---|---|
| EP | 3264030 A1 | 3/2018 |
| WO | 2009/081121 A1 | 7/2009 |
| WO | 2019/131298 A1 | 7/2019 |

OTHER PUBLICATIONS

Extended European search report (EESR) issued on Aug. 21, 2023 in a counterpart European patent application.

* cited by examiner

*Primary Examiner* — Jonathan M Hansen
(74) *Attorney, Agent, or Firm* — METROLEX IP LAW GROUP, PLLC; Robert L. Scott, Esq.

(57) ABSTRACT

A conversion unit converts a first electrical signal to a first distance value indicating a distance from an interferometer to a measurement target. An inclination value calculation unit calculates an inclination value based on the first distance value. A first distance value correction unit corrects the first distance value based on the inclination value. A second distance value correction unit calculates a second distance value indicating a distance from the optical interference range sensor to the measurement target based on the first distance value that has been corrected by the first distance value correction unit. If the number of times that the first electrical signal is detected is smaller than a second threshold, the first distance value correction unit corrects the first distance value based on an inclination value that precedes the inclination value associated with the first distance value in a storage unit.

20 Claims, 16 Drawing Sheets

FIG. 11

| TIME | t1 | t2 | t3 | t4 | t5 | ... |
|---|---|---|---|---|---|---|
| NUMBER OF PEAKS | 3 | 3 | 1 | 2 | 3 | ... |
| INCLINATION VALUE | θ1 | θ2 | θ3 | θ4 | θ5 | ... |
| INDIVIDUAL DISTANCE VALUE | d1 | d2 | d3 | d4 | d5 | ... |

OPTICAL INTERFERENCE RANGE SENSOR

CROSS-REFERENCES TO RELATED APPLICATIONS

This application claims priority to Japanese Patent Application No. 2022-038181 filed on Mar. 11, 2022, the entire contents of which are incorporated herein by reference.

BACKGROUND

The disclosure relates to an optical interference range sensor.

In recent years, optical range sensors that contactlessly measure the distance to a measurement target have been widely used. For example, known optical range sensors include optical interference range sensors that generate an interference beam by interference between a reference beam and a measurement beam from a light beam projected from a wavelength-swept light source and measure the distance to a measurement target based on the interference beam.

For example, WO 2019/131298A discloses an optical interference tomographic imaging device that includes a light beam controller, a splitting means for splitting a plurality of optical beams from the light beam controller into object beams and reference beams, an irradiation means for irradiating a measurement target with a plurality of object beams, and an interference means for causing the object beams scattered from the measurement target to interfere with the reference beams and guiding the beams to a light receiver.

WO 2019/131298A is an example of background art.

SUMMARY

If the optical interference range sensor has a plurality of interferometers that generate interference beams, the inclination between the measurement target and the plurality of interferometers may need to be corrected. Meanwhile, there are cases where, from the viewpoint of improving accuracy or such, interference beams that are, to a certain degree, weak are excluded in advance and the distance to the measurement target is calculated based only on the interference beams that have not been excluded. In such cases, the accuracy of inclination correction may deteriorate.

An optical interference range sensor performs distance measurement after excluding, in advance, any interference beam that is, to a certain degree, weak from a plurality of interference beams and may have improved accuracy of inclination correction for a measurement target.

An optical interference range sensor according to one or more embodiments includes: a light source configured to project a light beam while continuously varying its wavelength; a plurality of interferometers to which the light beam projected from the light source is supplied, each of the plurality of interferometers being configured to generate an interference beam by interference between a measurement beam that is a light beam radiated toward a measurement target and reflected from the measurement target and a reference beam passing through an optical path that is at least partially different from an optical path of the measurement beam; a light-receiving unit configured to receive interference beams generated by the plurality of interferometers and convert the received interference beams into a plurality of electrical signals corresponding to the respective interferometers; and a processing unit configured to calculate a distance from the optical interference range sensor to the measurement target based on at least one first electrical signal whose intensity is not smaller than a first threshold, of the plurality of electrical signals, and output the calculated distance, wherein the processing unit includes: a conversion unit configured to convert the at least one first electrical signal to a first distance value indicating a distance to the measurement target from the interferometer corresponding to that first electrical signal; an inclination value calculation unit configured to calculate, based on the first distance value, an inclination value indicating inclination of the plurality of interferometers relative to the measurement target; a first distance value correction unit configured to reference a storage unit that sequentially stores the number of times that the first electrical signal is detected, the first distance value, and the inclination value in association with each other, and correct the first distance value based on the inclination value; and a second distance value calculation unit configured to calculate a second distance value indicating the distance from the optical interference range sensor to the measurement target based on the first distance value that has been corrected by the first distance value correction unit, and if the number of times that the first electrical signal is detected among the plurality of electrical signals is smaller than a second threshold, the first distance value correction unit corrects the first distance value based on an inclination value that precedes the inclination value associated with the first distance value in the storage unit.

According to one or more embodiments, if the number of times that the first electrical signal whose intensity is not smaller than the first threshold is detected out of the plurality of electrical signals is smaller than the second threshold, the first distance value converted from the first electrical signal is corrected based on an inclination value that precedes, in the chronological sequence, the inclination value associated with the first distance value in the storage unit. The accuracy of inclination correction for the measurement target may thus be improved.

The first threshold may be a value obtained by multiplying the largest intensity out of intensities of the plurality of electrical signals by a predetermined proportion.

According to one or more embodiments, the effect of improving the accuracy of inclination correction for the measurement target may be enhanced.

The first distance value correction unit may correct the first distance value if the inclination value satisfies a predetermined condition.

According to one or more embodiments, the accuracy of inclination correction may be improved in accordance with the degree of inclination.

The predetermined condition may include at least one inclination value that is not smaller than a third threshold.

According to one or more embodiments, the accuracy of inclination correction may be improved in accordance with the degree of inclination.

If the number of times that the first electrical signal is detected among the plurality of electrical signals is smaller than the second threshold, the first distance value correction unit may correct the first distance value based on an inclination value associated with a time when the number of times that the first electrical signal is detected is not smaller than a fourth threshold in the storage unit.

According to one or more embodiments, the accuracy of inclination correction for the measurement target may be improved.

The processing unit may further output the inclination value.

According to one or more embodiments, the user convenience may improve.

The inclination value calculation unit may calculate, as the inclination value, a value obtained by dividing a difference between first distance values corresponding to two interferometers out of the plurality of interferometers by a number obtained by adding one to the number of interferometers arranged between the two interferometers.

According to one or more embodiments, the accuracy of inclination correction for the measurement target may be improved.

The plurality of interferometers may include at least three interferometers arranged such that heads of the at least three interferometers form a substantially triangular shape in a plane, and the inclination value calculation unit may select two interferometers from interferometers corresponding to electrical signals each having an intensity not smaller than the first threshold such that a difference between a direction of a vector formed by starting points of the two interferometers, of the three interferometers, and an axial direction of inclination of the measurement target is closest to a right angle, and calculate the inclination value based at least on the first distance value corresponding to each of the two selected interferometers.

According to one or more embodiments, the degree of freedom increases in the configuration of the optical interference range sensor capable of improving the accuracy of inclination correction for the measurement target.

According to one or more embodiments, it may be possible to provide an optical interference range sensor in which measurement accuracy is improved by suppressing return beams between optical couplers.

BRIEF DESCRIPTION OF THE DRAWINGS

FIG. 11 is a diagram illustrating a table stored in a displacement sensor.

DETAILED DESCRIPTION

Figure 1:
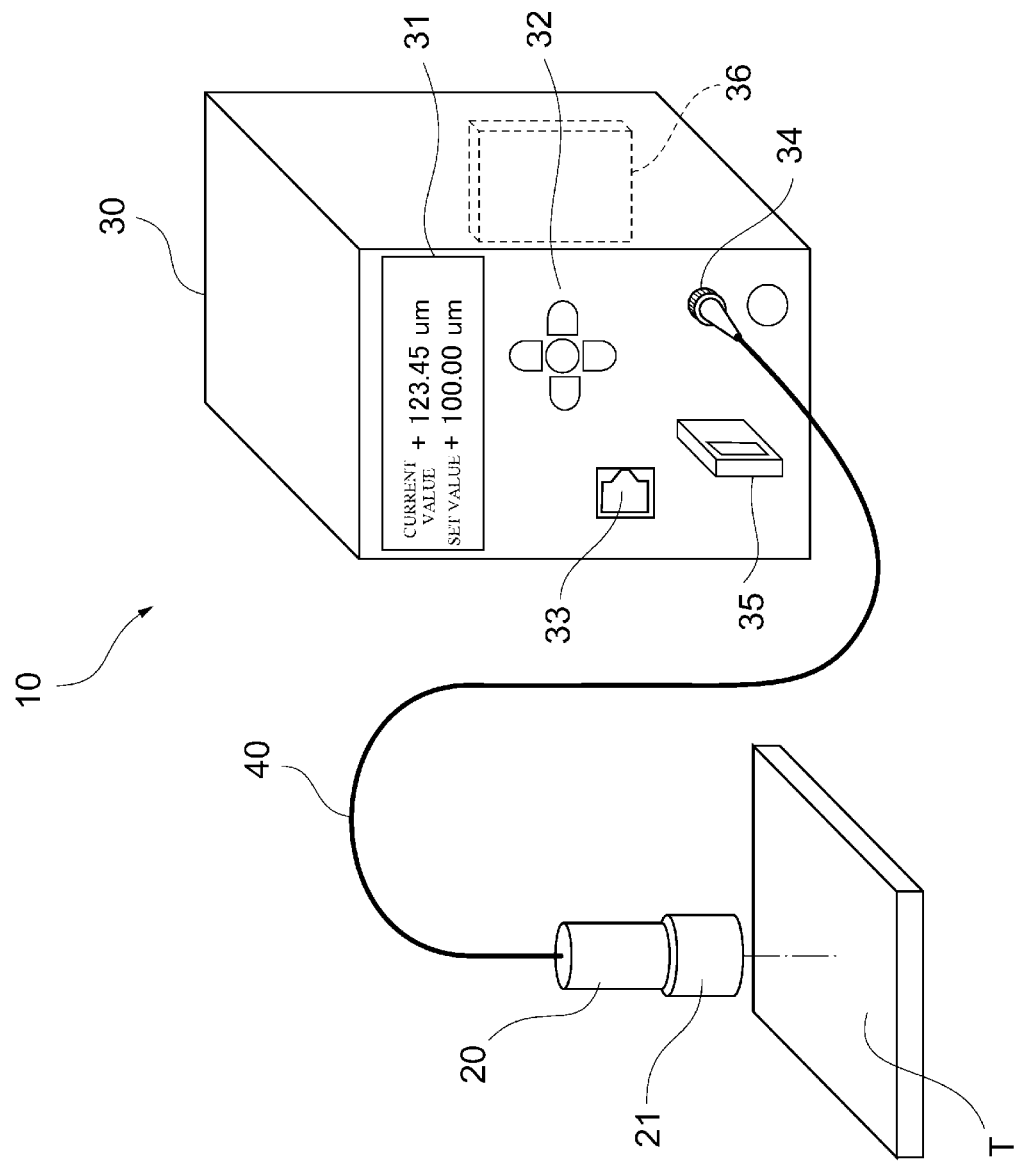
FIG. 1 is a schematic diagram illustrating an external appearance showing an outline of a displacement sensor according to one or more embodiments.

One or more embodiments will be described in detail with reference to the attached drawings. Note that the following embodiments are only for giving specific examples for carrying out one or more embodiments, and is not intended to interpret one or more embodiments in a limited manner. To facilitate understanding of the description, the same constituent elements in the drawings are assigned the same signs to the extent possible, and redundant descriptions may be omitted.

Summary of Displacement Sensor

Firstly, a summary of a displacement sensor according to the present disclosure will be described. FIG. 1 is a schematic diagram of an external appearance showing an outline of a displacement sensor 10 according to the present disclosure. As shown in FIG. 1, the displacement sensor 10 includes a sensor head 20 and a controller 30, and measures displacement of a measurement target T (distance to the measurement target T).

The sensor head 20 and the controller 30 are connected by an optical fiber cable 40. An objective lens 21 is attached to the sensor head 20. The controller 30 includes a display unit 31, a setting unit 32, an external interface (I/F) unit 33, an optical fiber cable connector 34, and an external storage unit 35, and also contains a measurement processing unit 36.

The sensor head 20 radiates a light beam output from the controller 30 toward the measurement target T, and receives a reflected beam from the measurement target T. The sensor head 20 contains reference surfaces for reflecting a light beam that is output from the controller 30 and received via the optical fiber cable 40 and causing the reflected beam to interfere with the aforementioned reflected beam from the measurement target T.

Note that the objective lens 21 attached to the sensor head 20 is removable. The objective lens 21 may be replaced by another objective lens having an appropriate focal length in accordance with the distance between the sensor head 20 and the measurement target T. Alternatively, a variable-focus objective lens may be used.

Furthermore, when the sensor head 20 is installed, a guide beam (visible light) may be radiated toward the measurement object T, and the sensor head 20 and/or the measurement object T may be placed so that the measurement object T is appropriately positioned within a measurement area of the displacement sensor 10.

The optical fiber cable 40 is connected to the optical fiber cable connector 34 arranged on the controller 30 and connects the controller 30 to the sensor head 20. The optical fiber cable 40 thus guides a light beam projected from the controller 30 to the sensor head 20 and also guides return beams from the sensor head 20 to the controller 30. Note that the optical fiber cable 40 may be attached to and detached from the sensor head 20 and the controller 30, and may be an optical fiber with any of various lengths, thicknesses, and characteristics.

The display unit 31 is a liquid crystal display, an organic EL display, or the like, for example. The display unit 31 displays set values for the displacement sensor 10, the amount of light of return beams from the sensor head 20, and measurement results such as displacement of the measurement target T (distance to the measurement target T) measured by the displacement sensor 10.

The setting unit 32 may allow a user to operate a mechanical button or a touch panel, for example, to configure settings necessary for measuring the measurement target T. Some or all of these necessary settings may be configured in advance, or may be configured from an externally connected device (not shown) that is connected to the external I/F unit 33. The externally connected device may be connected by wire or wirelessly via a network.

Here, the external I/F unit 33 is constituted by, for example, Ethernet (registered trademark), RS232C, analog output, or the like. The external I/F unit 33 may be connected to another connection device so that necessary settings are configured from the externally connected device, and may also output the results of measurement performed by the displacement sensor 10 to the externally connected device, for example.

Further, settings necessary for measuring the measurement target T may also be configured by the controller 30 retrieving data stored in the external storage unit 35. The external storage unit 35 is an auxiliary storage device such as a USB (Universal Serial Bus) memory. Settings or the like necessary for measuring the measurement target T are stored therein in advance.

The measurement processing unit 36 in the controller 30 includes, for example, a wavelength-swept light source that projects a light beam while continuously varying the wavelength, light-receiving elements that receive return beams from the sensor head 20 and convert the received beams to an electrical signal, a signal processing circuit that processes the electrical signal, and the like. The measurement processing unit 36 performs various processes using a controller, a storage, and the like based on return beams from the sensor head 20 so that the displacement of the measurement target T (distance to the measurement target T) is ultimately calculated. The details of the processing will be described later.

Figure 2:
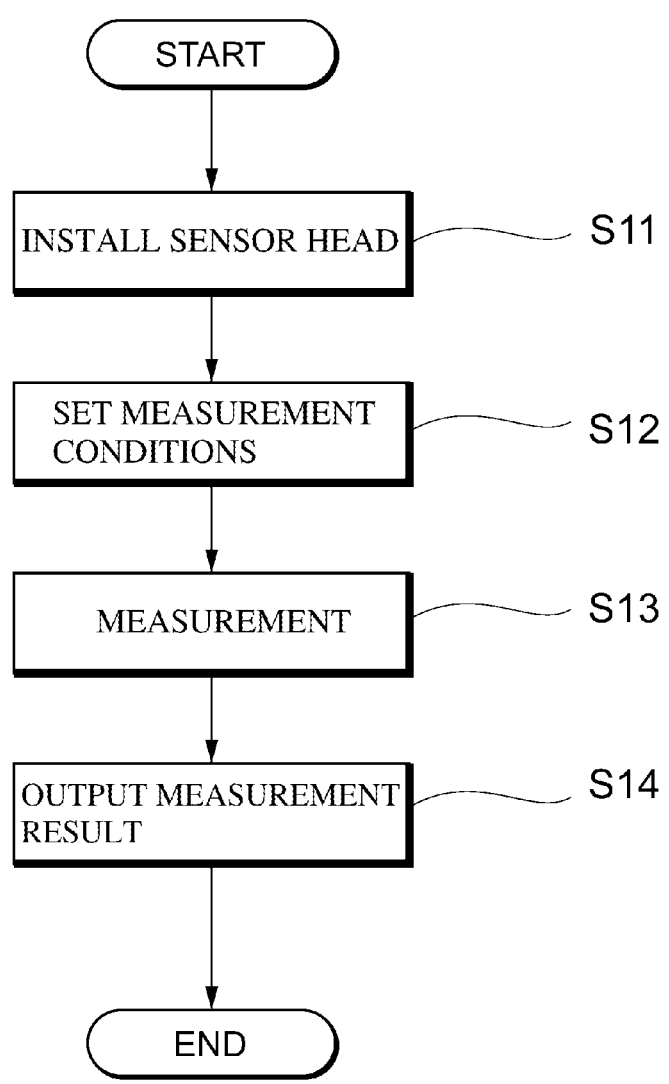
FIG. 2 is a flowchart illustrating a procedure for measuring a measurement target T with use of a displacement sensor according to one or more embodiments

FIG. 2 is a flowchart showing a procedure for measuring a measurement target T with use of the displacement sensor 10 according to the present disclosure. The procedure includes steps S11 to S14, as shown in FIG. 2.

In step S11, the sensor head 20 is installed. For example, a guide beam is radiated from the sensor head 20 toward the measurement target T, and the sensor head 20 is installed at an appropriate position while referencing the radiated guide light.

Specifically, the amount of light of return beams received from the sensor head 20 may be displayed in the display unit 31 in the controller 30. The user may also adjust the orientation of the sensor head 20, the distance (height position) to the measurement target T, or the like while checking the amount of received light. Basically, if the light beam from the sensor head 20 is radiated more vertically (at an angle closer to vertical) relative to the measurement target T, the amount of light of reflected beams from the measurement target T becomes larger, and the amount of light of return beams received from the sensor head 20 also becomes larger.

The objective lens 21 may also be replaced with one having an appropriate focal length in accordance with the distance between the sensor head 20 and the measurement target T.

If appropriate settings cannot be configured (e.g., a necessary amount of received light for measurement cannot be obtained, or the focal length of the objective lens 21 is inappropriate etc.) when the measurement target T is measured, the user may be notified by displaying an error message, an incomplete setting message, or the like in the display unit 31 or outputting such a message to the externally connected device.

In step S12, various measurement conditions are set to measure the measurement target T. For example, the user sets unique calibration data (function etc. for correcting linearity) that the sensor head 20 has by operating the setting unit 32 in the controller 30.

Various parameters may also be set. For example, the sampling time, the measurement range, a threshold for determining whether to regard measurement results as normal or abnormal, or the like are set. Further, a measurement period may be set in accordance with characteristics of the measurement target T, such as the reflectance and material of the measurement target T, and a measurement mode or the like corresponding to the material of the measurement target T may also be set.

Note that these measurement conditions and various parameters are set by operating the setting unit 32 in the controller 30, but may alternatively be set from the externally connected device or may be set by retrieving data from the external storage unit 35.

In step S13, the measurement target T is measured with the sensor head 20 installed in step S11 in accordance with the measurement conditions and various parameters that are set in step S12.

Specifically, in the measurement processing unit 36 in the controller 30, the wavelength-swept light source projects a light beam, the light-receiving elements receive return beams from the sensor head 20, the signal processing circuit performs, for example, frequency analysis, distance conversion, peak detection, and the like to calculate displacement of the measurement target T (distance to the measurement target T). The details of specific measurement processing will be described later.

In step S14, the result of measurement in step S13 is output. For example, the displacement of the measurement target T (distance to the measurement target T) or the like measured in step S13 is displayed in the display unit 31 in the controller 30 or output to the externally connected device.

In addition, whether the displacement of the measurement target T (distance to the measurement target T) measured in step S13 is in a normal range or is abnormal based on the threshold set in step S12 may also be displayed or output as a measurement result. Furthermore, the measurement conditions, various parameters, the measurement mode, or the like that are set in step S12 may also be displayed or output together.

Overview of System that Includes Displacement Sensor

Figure 3:
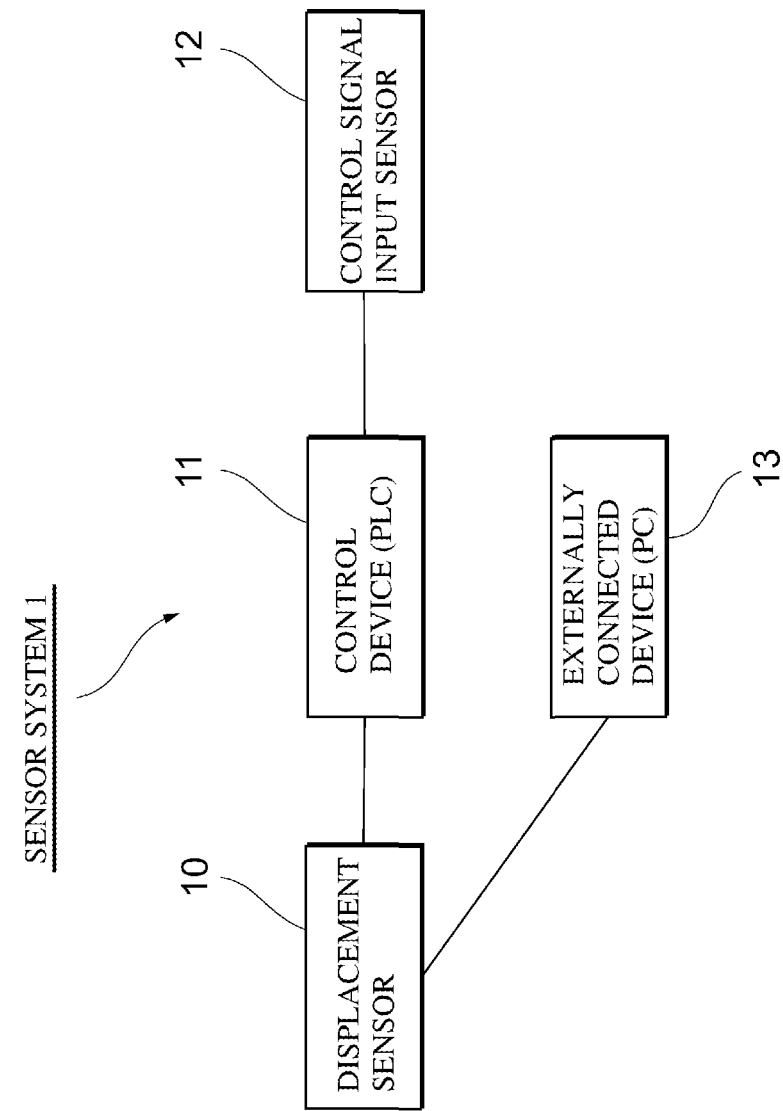
FIG. 3 is a functional block diagram illustrating an overview of a sensor system that uses a displacement sensor according to one or more embodiments.

FIG. 3 is a functional block showing an overview of a sensor system 1 that uses the displacement sensor 10 according to the present disclosure. The sensor system 1 includes the displacement sensor 10, a control device 11, a control signal input sensor 12, and an externally connected device 13, as shown in FIG. 3. Note that the displacement sensor 10 is connected to the control device 11 and the externally connected device 13 by a communication cable or an external connection code (which may include an external input line, an external output line, a power line, etc.), for example. The control device 11 and the control signal input sensor 12 are connected by a signal line.

The displacement sensor 10 measures displacement of the measurement target T (distance to the measurement target T), as described with reference to FIGS. 1 and 2. The displacement sensor 10 may also output the measurement results or the like to the control device 11 and the externally connected device 13.

The control device 11 is a PLC (Programmable Logic Controller), for example, and gives the displacement sensor 10 various instructions when the displacement sensor 10 measures the measurement target T.

For example, the control device 11 may output a measurement timing signal to the displacement sensor 10 based on an input signal from the control signal input sensor 12 connected to the control device 11, and may also output a zero-reset command signal (a signal for setting a current measurement value to 0) or the like to the displacement sensor 10.

The control signal input sensor 12 outputs, to the control device 11, an on/off signal to indicate the timing for the displacement sensor 10 to measure the measurement target T. For example, the control signal input sensor 12 may be installed near a production line in which the measurement target T moves, and may output the on/off signal to the control device 11 in response to detecting that the measurement target T has moved to a predetermined position.

The externally connected device 13 is a PC (Personal Computer), for example. The user may configure various setting to the displacement sensor 10 by operating the externally connected device 13.

As an example, the measurement mode, the work mode, the measurement period, the material of the measurement target T, and the like are set.

An "internally synchronized measurement mode", in which measurement periodically starts within the control device 11, or an "externally synchronized measurement mode", in which measurement starts in response to an input signal from outside the control device 11, or the like may be selected as a setting of the measurement mode.

An "operation mode", in which the measurement target T is actually measured, an "adjustment mode", in which measurement conditions for measuring the measurement target T are set, or the like may be selected as a work mode setting.

The "measurement period" refers to a period for measuring the measurement target T and may be set in accordance with the reflectance of the measurement target T. Even if the measurement target T has a low reflectance, the measurement target T may be appropriately measured by lengthening the measurement period to set an appropriate measurement period.

As a mode for the measurement target T, a "rough surface mode", which is suitable when the components of the reflected beam reflected from the measurement target T include a relatively large diffuse reflection, a "specular mode", which is suitable when the components of the reflected beam include a relatively large specular reflection, an intermediate "standard mode", or the like may be selected.

Thus, the measurement target T may be measured with higher accuracy by configuring appropriate settings in accordance with the reflectance and material of the measurement target T.

Figure 4:
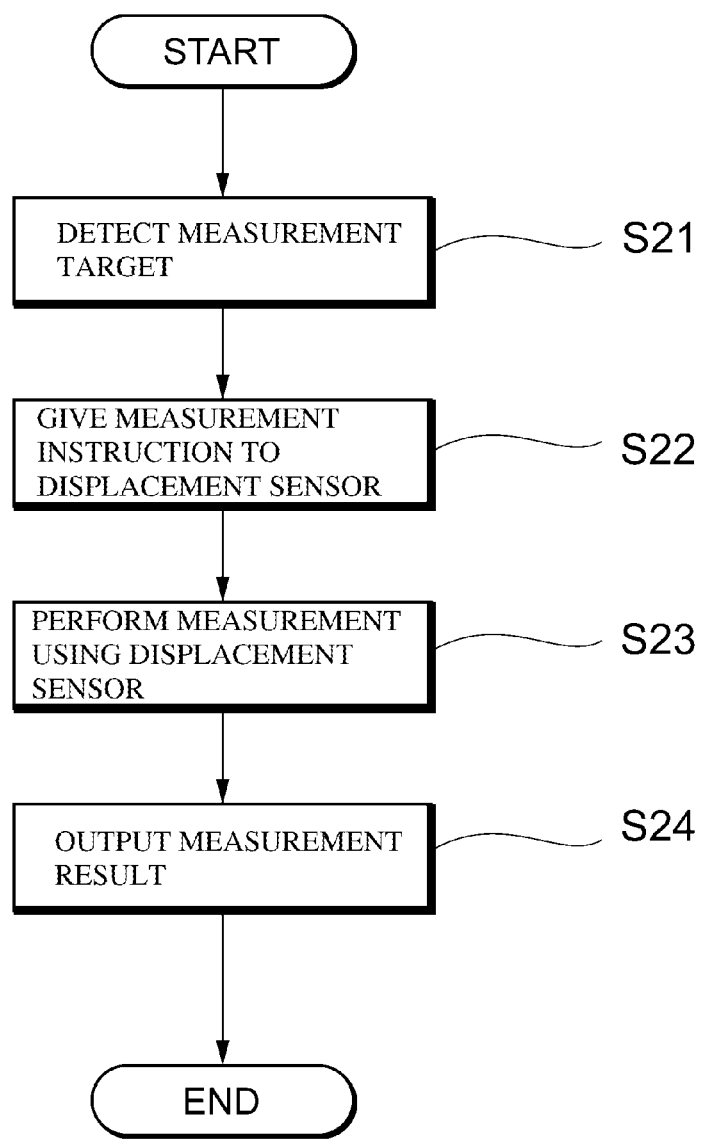
FIG. 4 is a flowchart illustrating a procedure for measuring a measurement target T with use of a sensor system that uses a displacement sensor according to one or more embodiments.

FIG. 4 is a flowchart showing a procedure for measuring the measurement target T with use of the sensor system 1 that uses the displacement sensor 10 according to the present disclosure. As shown in FIG. 4, the procedure is for the case of the aforementioned externally synchronized measurement mode and includes steps S21 to S24.

In step S21, the sensor system 1 detects the measurement target T, which is an object to be measured. Specifically, the control signal input sensor 12 detects that the measurement target T has moved to a predetermined position on a production line.

In step S22, the sensor system 1 gives an instruction to measure the measurement target T detected in step S21, with use of the displacement sensor 10. Specifically, the control signal input sensor 12 indicates the timing of measuring the measurement target T detected in step S21 by outputting an on/off signal to the control device 11. The control device 11 outputs a measurement timing signal to the displacement sensor 10 based on the on/off signal to give an instruction to measure the measurement target T.

In step S23, the displacement sensor 10 measures the measurement target T. Specifically, the displacement sensor 10 measures the measurement target T based on the measurement instruction received in step S22.

In step S24, the sensor system 1 outputs the result of measurement in step S23. Specifically, the displacement sensor 10 causes the display unit 31 to display the result of measurement processing, and/or outputs the result to the control device 11, the externally connected device 13, or the like via the external I/F unit 33.

Note that the above description has been given, with reference to FIG. 4, of the procedure in the case of the externally synchronized measurement mode in which the measurement target T is measured upon the control signal input sensor 12 detecting the measurement target T. However, there is no limitation thereto. In the case of the internally synchronized measurement mode, for example, an instruction to measure the measurement target T is given to the displacement sensor 10 upon a measurement timing signal being generated based on a preset period, instead of steps S21 and S22.

Figure 5A:
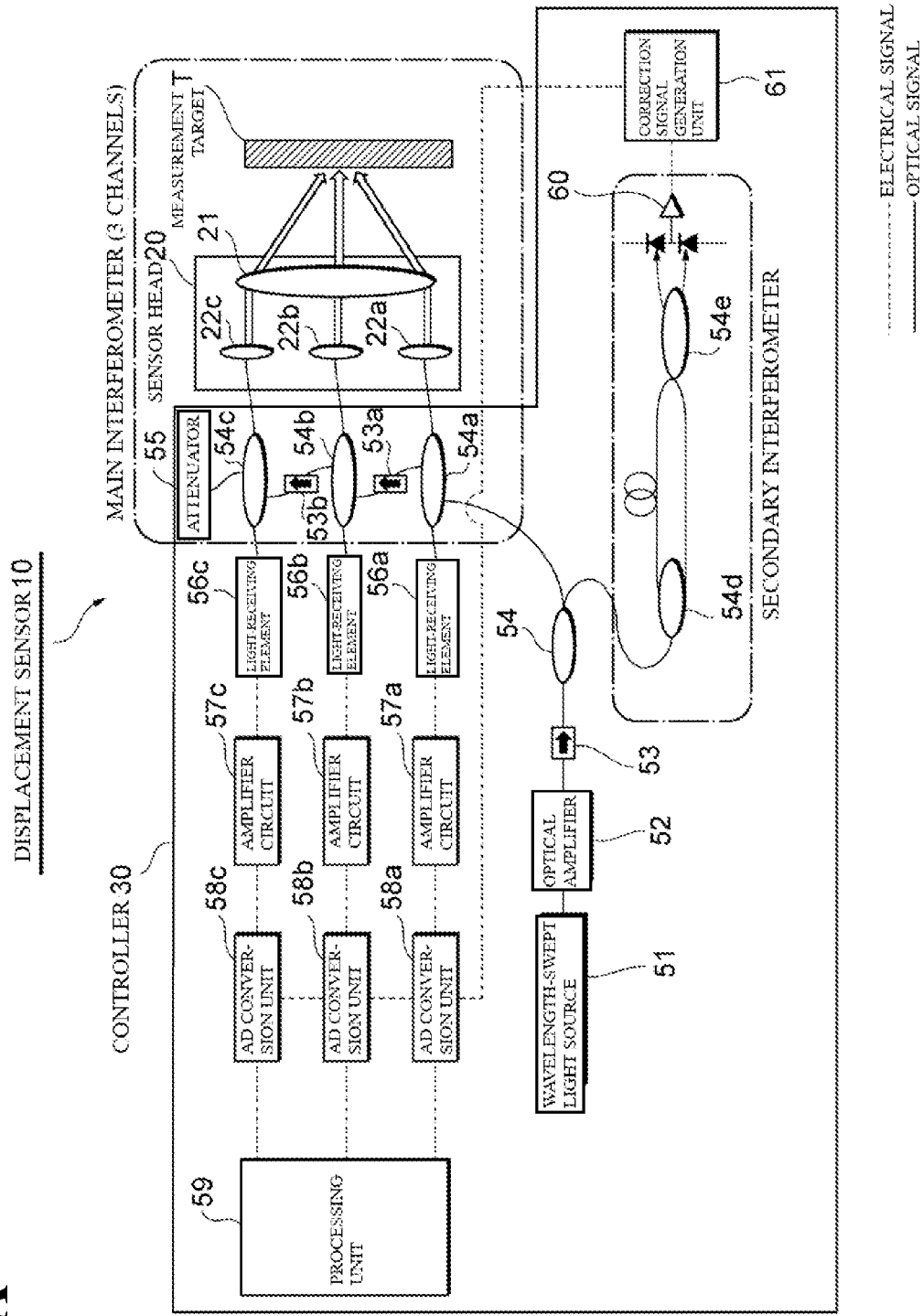
FIG. 5A is a diagram illustrating a principle by which a displacement sensor according to a present disclosure measures a target object T.

Next, a description will be given of the principle by which the displacement sensor 10 according to the present disclosure measures the measurement target T. FIG. 5A is a diagram illustrating a principle by which the displacement sensor according to the present disclosure measures a measurement target T. As shown in FIG. 5A, the displacement sensor 10 includes the sensor head 20 and the controller 30. The sensor head 20 includes the objective lens 21 and a plurality of collimating lenses 22a to 22c. The controller 30 includes a wavelength-swept light source 51, an optical amplifier 52, a plurality of isolators 53, 53a, and 53b, a plurality of optical couplers 54 and 54a to 54e, an attenuator 55, a plurality of light-receiving elements (e.g., photodetectors (PD)) 56a to 56c, a plurality of amplifier circuits 57a to 57c, a plurality of analog-to-digital (AD) conversion units (e.g., analog-to-digital converters) 58a to 58c, a processing unit (e.g., processor) 59, a balance detector 60, and a correction signal generation unit 61.

The wavelength-swept light source 51 projects a wavelength-swept laser beam. The wavelength-swept light source 51 may be realized at low cost by, for example, applying a method of modulating a VCSEL (Vertical Cavity Surface Emitting Laser) with current since mode hopping is unlikely to occur due to a short resonator length, and the wavelength may be easily varied.

The optical amplifier 52 amplifies the beam projected from the wavelength-swept light source 51. The optical amplifier 52 is an EDFA (erbium-doped fiber amplifier), for example, and may be an optical amplifier dedicated to 1550 nm, for example.

The isolator 53 is an optical element through which an incident light beam is unidirectionally transmitted, and may immediately follow the wavelength-swept light source 51 in order to prevent the effect of noise generated by return beams.

Thus, the light beam projected from the wavelength-swept light source 51 is amplified by the optical amplifier 52, passes through the isolator 53, and is split into beams proceeding to a main interferometer and a secondary interferometer by the optical coupler 54. For example, the optical coupler 54 may split the light beam into the beams proceeding to the main and secondary interferometers at a ratio of 90:10 to 99:1.

The light beam that is split and proceeds to the main interferometer is further split into a beam in a direction toward the sensor head 20 and a beam in a direction toward the second-stage optical coupler 54b by the first-stage optical coupler 54a.

The light beam that is split in the direction toward the sensor head 20 by the first-stage optical coupler 54a passes through the collimating lens 22a and the objective lens 21 from the leading end of an optical fiber cable in the sensor head 20, and is radiated toward the measurement target T. Then, a light beam reflected at a reference surface, which is the leading end (end face) of the optical fiber cable, interferes with a light beam reflected at the measurement target T, and an interference beam is generated. The generated interference beam returns to the first-stage optical coupler 54a, and is thereafter received by the light-receiving element 56a and converted into an electrical signal.

The light beam that is split in the direction toward the second-stage optical coupler 54b by the first-stage optical coupler 54a proceeds toward the second-stage optical coupler 54b via the isolator 53a, and is further split in a direction toward the sensor head 20 and a direction toward the third-stage optical coupler 54c by the second-stage optical coupler 54b. The light beam that is split in the direction toward the sensor head 20 from the optical coupler 54b passes through the collimating lens 22b and the objective lens 21 from the leading end of an optical fiber cable in the sensor head 20, as with the first stage, and is radiated toward the measurement target T. Then, a light beam reflected at a reference surface, which is the leading end (end face) of the optical fiber cable, interferes with a light beam reflected at the measurement target T, and an interference beam is generated. The generated interference beam returns to the second-stage optical coupler 54b, and is split into beams in a direction toward the isolator 53a and a direction toward the light-receiving element 56b by the optical coupler 54b. The light beam that is split in the direction toward the light-receiving element 56b from the optical coupler 54b is received by the light-receiving element 56b and converted into an electrical signal. Meanwhile, the isolator 53a is configured to transmit a light beam from the previous-stage optical coupler 54a toward the latter-stage optical coupler 54b and cut off a light beam from the latter-stage optical coupler 54b toward the previous-stage optical coupler 54a. Therefore, the beam split in the direction toward the isolator 53a from the optical coupler 54b is cut off.

The light beam that is split in the direction toward the third-stage optical coupler 54c by the second-stage optical coupler 54b proceeds toward the third-stage optical coupler 54c via the isolator 53b, and is further split in the direction toward the sensor head 20 and a direction toward the attenuator 55 by the third-stage optical coupler 54c. The light beam that is split in the direction toward the sensor head 20 from the optical coupler 54c passes through the collimating lens 22c and the objective lens 21 from the leading end of an optical fiber cable in the sensor head 20, as with the first and second stages, and is radiated toward the measurement target T. Then, a light beam reflected at the reference surface, which is the leading end (end face) of the optical fiber cable, interferes with a light beam reflected at the measurement target T, and an interference beam is generated. The generated interference beam returns to the third-stage optical coupler 54c, and is split into beams in a direction toward the isolator 53b and a direction toward the light-receiving element 56c by the optical coupler 54c. The light beam that is split in the direction toward the light-receiving element 56c from the optical coupler 54c is received by the light-receiving element 56c and converted into an electrical signal. Meanwhile, the isolator 53b is configured to transmit a light beam from the previous-stage optical coupler 54b toward the latter-stage optical coupler 54c and cut off a light beam from the latter-stage optical coupler 54c toward the previous-stage optical coupler 54b. Therefore, the beam split in the direction toward the isolator 53b from the optical coupler 54c is cut off.

Note that the light beam that is split in a direction other than the direction toward the sensor head 20 by the third-stage optical coupler 54c is not used to measure the measurement target T. Therefore, it may be favorable to attenuate the light beam with the attenuator 55, which is a terminator or the like, so as not to be reflected and returned.

Thus, the main interferometer is an interferometer that has three stages of optical paths (three channels) each having an optical path length difference that is twice (round trip) the distance from the leading end (end face) of the optical fiber cable of the sensor head 20 to the measurement target T, and three interference beams corresponding to respective optical path length differences are generated.

The light-receiving elements 56a to 56c receive the interference beams from the main interferometer and generate electrical signals in accordance with the amount of light of the light beams received, as mentioned above.

The amplifier circuits 57a to 57c amplify the electrical signals output from the light-receiving elements 56a to 56c, respectively.

The AD conversion units 58a to 58c receive the electrical signals from the respective amplifier circuits 57a to 57c and convert these electrical signals from analog signals to digital signals (AD conversion). Here, the AD conversion units 58a to 58c perform AD conversion based on a correction signal from the correction signal generation unit 61 of the secondary interferometer.

The secondary interferometer obtains the interference signal in order to correct wavelength nonlinearities during the sweep with the wavelength-swept light source 51, and generates a correction signal called a K-clock.

Specifically, the light beam that is split and proceeds to the secondary interferometer by the optical coupler 54 is further split by the optical coupler 54d. Here, the optical paths of the split light beams are configured to have an optical path length difference using optical fiber cables with different lengths between the optical couplers 54d and 54e, and an interference beam corresponding to the optical path length difference is output from the optical coupler 54e, for example. The balance detector 60 receives the interference beam from the optical coupler 54e, and amplifies the optical signal and converts it to an electrical signal while removing noise by taking a difference from a signal of the opposite phase.

Note that the optical coupler 54d and the optical coupler 54e may split the light beam at a ratio of 50:50.

The correction signal generation unit 61 ascertains the wavelength nonlinearities during the sweep with the wavelength-swept light source 51 based on the electrical signal from the balance detector 60, generates a K-clock corresponding to the nonlinearities, and outputs the generated K-clock to the AD conversion units 58a to 58c.

Due to the wavelength nonlinearities during the sweep with the wavelength-swept light source 51, the wave intervals of the analog signals input to the AD conversion units 58a to 58c from the main interferometer are not equal. The AD conversion units 58a to 58c performs AD conversion (sampling) while correcting the sampling time based on the aforementioned K-clock so that the wave intervals are equal intervals.

Note that the K-clock is a correction signal used to sample the analog signal of the main interferometer, as mentioned above. Therefore, the K-clock needs to be generated so as to have a higher frequency than the analog signal of the main interferometer. Specifically, the optical path length difference provided between the optical coupler 54d and the optical coupler 54e in the secondary interferometer may be longer than optical path length differences between the leading ends (end faces) of the optical fiber cables in the main interferometer and the measurement target T. Alternatively, the correction signal generation unit 61 may increase the frequency by multiplication (e.g., by a factor of 8, etc.).

The processing unit 59 obtains the digital signals that have been subjected to AD conversion with its nonlinearities corrected respectively by the AD conversion units 58a to 58c, and calculates displacement of the measurement target T (distance to the measurement target T) based on the digital signal. Specifically, the processing unit 59 performs frequency conversion on the digital signal using fast Fourier transform (FFT), and calculates the distance by analyzing them. The details of processing at the processing unit 59 will be described later.

Note that the processing unit 59 is required to perform high-speed processing, and is therefore realized by an integrated circuit such as an FPGA (field-programmable gate array) in many cases.

Also, here, three stages of optical paths are provided in the main interferometer. The sensor head 20 radiates measurement beams from the respective optical paths toward the measurement target T, and the distance to the measurement target T, for example, is measured based on interference beams (return beams) obtained from the respective optical paths (multichannel). The number of channels in the main interferometer is not limited to three, and may alternatively be one or two, or may be four or more.

Figure 5B:
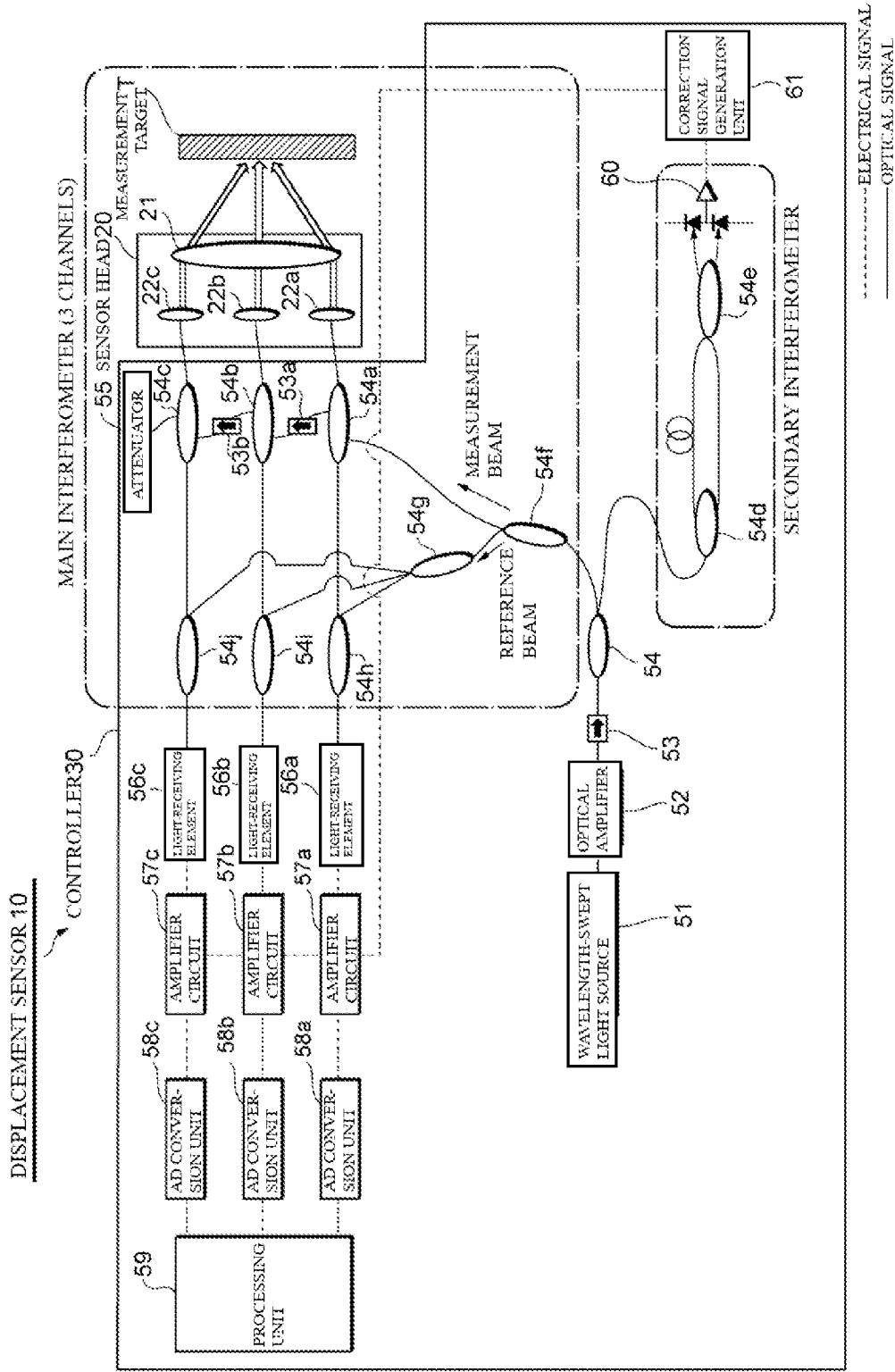
FIG. 5B is a diagram illustrating another principle by which a displacement sensor according to a present disclosure measures a measurement target T.

FIG. 5B is a diagram illustrating another principle by which a displacement sensor 10 according to the present disclosure may measure the measurement target T. As shown in FIG. 5B, the displacement sensor 10 includes a sensor head 20 and a controller 30. The sensor head 20 includes an objective lens 21 and a plurality of collimating lenses 22a to 22c. The controller 30 includes a wavelength-swept light source 51, an optical amplifier 52, a plurality of isolators 53, 53a and 53b, a plurality of optical couplers 54 and 54a to 54j, an attenuator 55, a plurality of light-receiving elements (e.g., photodetectors (PD)) 56a to 56c, a plurality of amplifier circuits 57a to 57c, a plurality of analog-to-digital (AD) conversion units (e.g., analog-to-digital converters) 58a to 58c, a processing unit (e.g., processor) 59, a balance detector 60, and a correction signal generation unit 61. The displacement sensor 10 shown in FIG. 5B has a configuration different from that of the displacement sensor 10 shown in FIG. 5A mainly in that the former has the optical couplers 54f to 54j. A principle of the different configuration will be described in detail in comparison with FIG. 5A.

The light beam projected from the wavelength-swept light source 51 is amplified by the optical amplifier 52, and is split into a beam proceeding to the main interferometer side and a beam proceeding to the secondary interferometer side by the optical coupler 54 via the isolator 53. The light beam that is split and proceeds to the main interferometer side is further split into a measurement beam and a reference beam by the optical coupler 54f.

The measurement beam is caused to pass through the collimating lens 22a and the objective lens 21 by the first-stage coupler 54a and radiated to the measurement target T, and is reflected at the measurement target T, as described with reference to FIG. 5A. Here, in FIG. 5A, the light beam reflected at the reference surface, which is the leading end (end face) of an optical fiber cable, interferes with the light beam reflected at the measurement target T, and an interference beam is generated. Meanwhile, in FIG. 5B, the reference surface that reflects the light beam is not provided. In other words, the light that is reflected at the reference surface as in FIG. 5A is not generated in FIG. 5B, and therefore, the measurement beam reflected at the measurement target T returns to the first-stage optical coupler 54a.

Similarly, the light beam that is split in the direction toward the second-stage optical coupler 54b from the first-stage optical coupler 54a is caused to pass through the collimating lens 22b and the objective lens 21 by the second-stage optical coupler 54b and radiated toward the measurement target T, and is reflected at the measurement target T and returns to the second-stage optical coupler 54b. The light beam that is split in the direction toward the third-stage optical coupler 54c from the second-stage optical coupler 54b is caused to pass through the collimating lens 22c and the objective lens 21 by the third-stage optical coupler 54c and radiated toward the measurement target T, and is reflected at the measurement target T and returns to the third-stage optical coupler 54c.

Meanwhile, the reference beam split by the optical coupler 54f is further split into beams proceeding to the optical couplers 54h, 54i, and 54j by the optical coupler 54g.

In the optical coupler 54h, the measurement beam that has been reflected at the measurement target T and output from the optical coupler 54a interferes with the reference beam output from the optical coupler 54g, and an interference beam is generated. The interference beam is received by the light-receiving element 56a and converted into an electrical signal. In other words, a light beam is split into the measurement beam and the reference beam by the optical coupler 54f, an interference beam is generated in correspondence with the optical path length difference between the optical path of the measurement beam (an optical path in which the light beam from the optical coupler 54f is reflected at the measurement target T via the optical coupler 54a, the collimating lens 22a and the objective lens 21 and reaches the optical coupler 54h) and the optical path of the reference beam (an optical path in which the light beam from the optical coupler 54f reaches the optical coupler 54h via the optical coupler 54g). The interference beam is received by the light-receiving element 56a and converted into an electrical signal.

Similarly, in the optical coupler 54i, an interference beam is generated in correspondence with the optical path length difference between the optical path of the measurement beam (an optical path in which the light beam from the optical coupler 54f is reflected at the measurement target T via the optical couplers 54a and 54b, the collimating lens 22b, and the objective lens 21 and reaches the optical coupler 54i) and the optical path of the reference beam (an optical path in which the light beam from the optical coupler 54f reaches the optical coupler 54i via the optical coupler 54g). The interference beam is received by the light-receiving element 56b and converted into an electrical signal.

In the optical coupler 54j, an interference beam is generated in correspondence with the optical path length difference between the optical path of the measurement beam (an optical path in which the light beam from the optical coupler 54f is reflected at the measurement target T via the optical couplers 54a, 54b, and 54c, the collimating lens 22c, and the objective lens 21 and reaches the optical coupler 54j) and the optical path of the reference beam (an optical path in which the light beam from the optical coupler 54f reaches the optical coupler 54j via the optical coupler 54g). The interference beam is received by the light-receiving element 56c and converted into an electrical signal. Note that the light-receiving elements 56a to 56c may be balance photodetectors, for example.

Thus, the main interferometer has three stages of optical paths (three channels), and generates three interference beams corresponding to the respective optical path length differences between the measurement beams that are reflected at the measurement target T and input to the optical couplers 54h, 54i, and 54j and the reference beams that are input to the optical couplers 54h, 54i, and 54j via the optical couplers 54f and 54g.

Note that the optical path length difference between a measurement beam and a reference beam may also be set so as to be different among the three channels. For example, the optical path lengths from the optical coupler 54g may be different among the optical couplers 54h, 54i, and 54j.

The distance to the measurement target T or the like is measured based on the interference beams obtained from respective optical paths (multichannel).

Configuration of Sensor Head

Figure 6A:
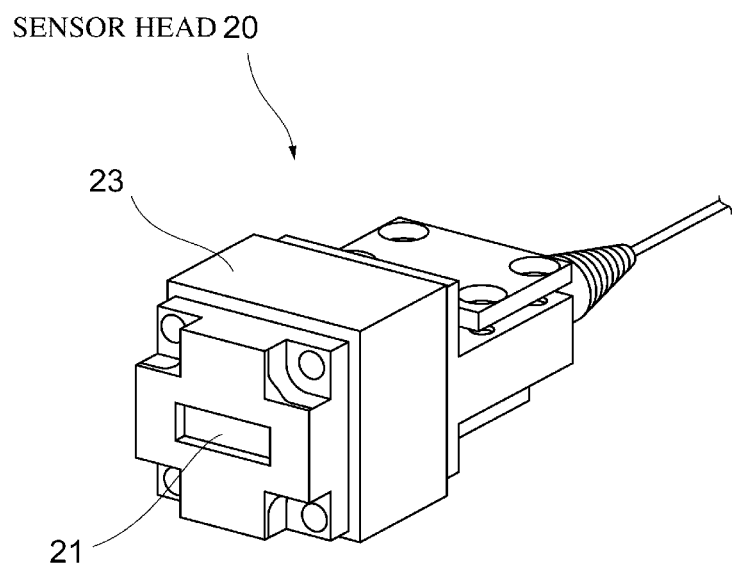
FIG. 6A is a diagram illustrating a perspective view of a schematic configuration of a sensor head.
Figure 6B:
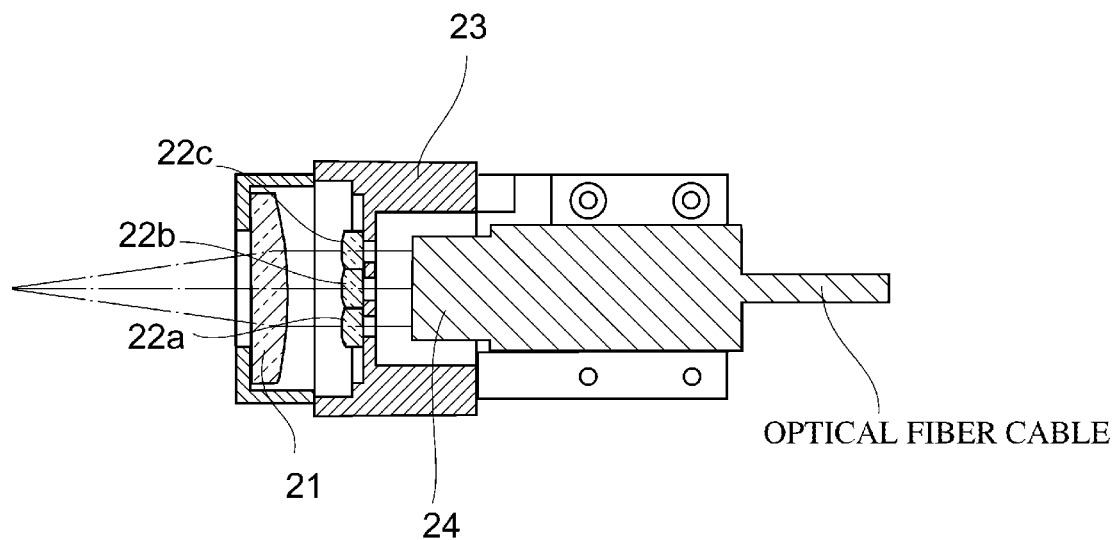
FIG. 6B is a diagram illustrating a schematic view of an internal structure of a sensor head.

Here, a structure of the sensor head used in the displacement sensor 10 will be described. FIG. 6A is a perspective view showing a schematic configuration of the sensor head 20. FIG. 6B is a schematic view of an internal structure of the sensor head.

In the sensor head 20, the objective lens 21 and the collimating lenses are accommodated in a lens holder 23, as shown in FIG. 6A. For example, the individual sides of the objective lens holder 23 that surround the objective lens 21 are about 20 mm long, and the lens holder 23 is about 40 mm in length in the optical axis direction.

As shown in FIG. 6B, the lens holder 23 accommodates one objective lens 21 and three collimating lenes 22a to 22c. Light from the optical fiber cables are guided to the three collimating lenses 22a to 22c via an optical fiber array 24, and the light that has passed through the three collimating lenses 22a to 22c is radiated toward the measurement target T via the objective lens 21.

Thus, the optical fibers, the collimating lenses 22a to 22c, and the optical fiber array 24 are held together with the objective lens 21 by the lens holder 23 and constitute the sensor head 20.

The lens holder 23 that constitutes the sensor head 20 may be made of a metal (e.g., A2017) that has high strength and may be processed with high accuracy.

Figure 7:
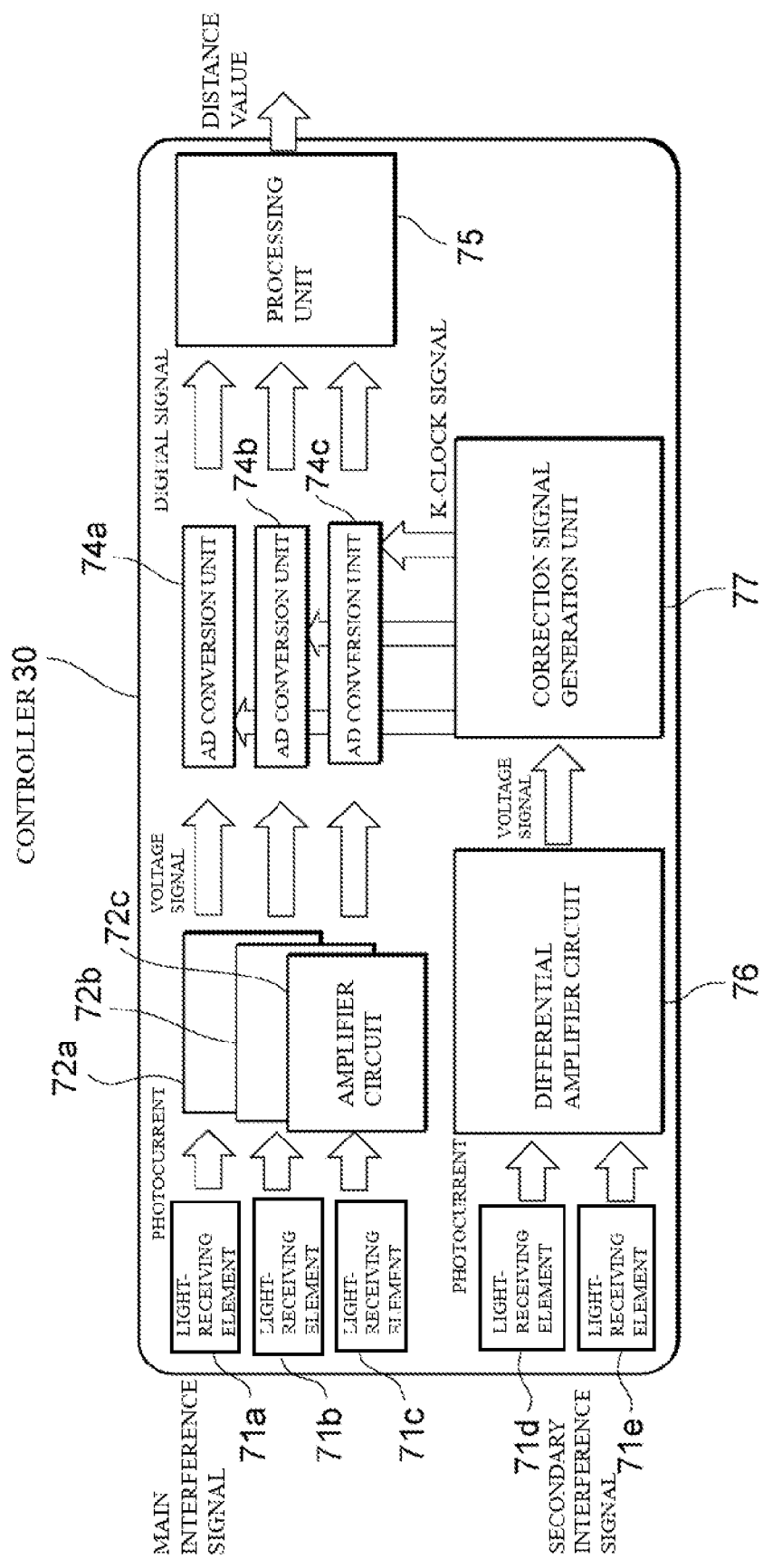
FIG. 7 is a block diagram illustrating signal processing performed by a controller.

FIG. 7 is a block diagram illustrating signal processing in the controller 30. As shown in FIG. 7, the controller 30 includes a plurality of light-receiving elements 71a to 71e, a plurality of amplifier circuits 72a to 72c, a plurality of AD conversion units 74a to 74c, a processing unit 75, a differential amplifier circuit 76, and a correction signal generation unit 77.

In the controller 30, the light beam projected from the wavelength-swept light source 51 is split into a beam proceeding to the main interferometer and a beam proceeding to the secondary interferometer by the optical coupler 54, and the value of the distance to the measurement target T is calculated by processing main interference signals and secondary interference signals obtained respectively from the main and secondary interferometers, as illustrated in FIG. 5A.

The plurality of light-receiving elements 71a to 71c correspond to the light-receiving elements 56a to 56c shown in FIG. 5A, receive the main interference signals from the main interferometer, and output the received signals as current signals to the amplifier circuits 72a to 72c, respectively.

The plurality of amplifier circuits 72a to 72c convert current signals to voltage signals (I-V conversion) and amplify these signals.

The plurality of AD conversion units 74a to 74c correspond to the AD conversion units 58a to 58c shown in FIG. 5A, and convert the voltage signal to a digital signal (AD conversion) based on a K-clock from the later-described correction signal generation unit 77.

The processing unit 75 corresponds to the processing unit 59 shown in FIG. 5A. The processing unit 75 converts the digital signals from the AD conversion units 74a to 74c to frequencies through FFT, calculates distance values (which may be referred to as "individual distance values") of the distances to the measurement target in correspondence with the respective collimating lenses 22a to 22c, analyzes the calculated distance values, and calculates a distance value (which may be referred to as a "final distance value") of the distance from the displacement sensor 10 to the measurement target T.

The plurality of light-receiving elements 71d to 71e and the differential amplifier circuit 76, which correspond to the balance detector 60 shown in FIG. 5A, receive interference beams from the secondary interferometer, output interference signals one of which has an inverted phase, and amplify the interference signals and convert these signals to a voltage signal while removing noise by taking a difference between the two signals.

The correction signal generation unit 77 corresponds to the correction signal generation unit 61 shown in FIG. 5A, binarizes the voltage signal using a comparator, generates a K-clock, and outputs the generated K-clock to the AD conversion units 74a to 74c. The K-clock needs to be generated so as to have a higher frequency than the analog signal of the main interferometer. Therefore, the correction signal generation unit 77 may increase the frequency by multiplication (e.g., by a factor of 8 etc.).

Next, one or more embodiments will be described in detail, focusing on more characteristic configurations, functions, and properties. Note that the following optical interference range sensor corresponds to the displacement sensor 10 described with reference to FIGS. 1 to 7. Some or all of the basic configurations, functions, and properties included in the optical interference range sensor are common to the configurations, functions, and properties included in the displacement sensor 10 described with reference to FIGS. 1 to 7.

First Embodiment

Figure 8:
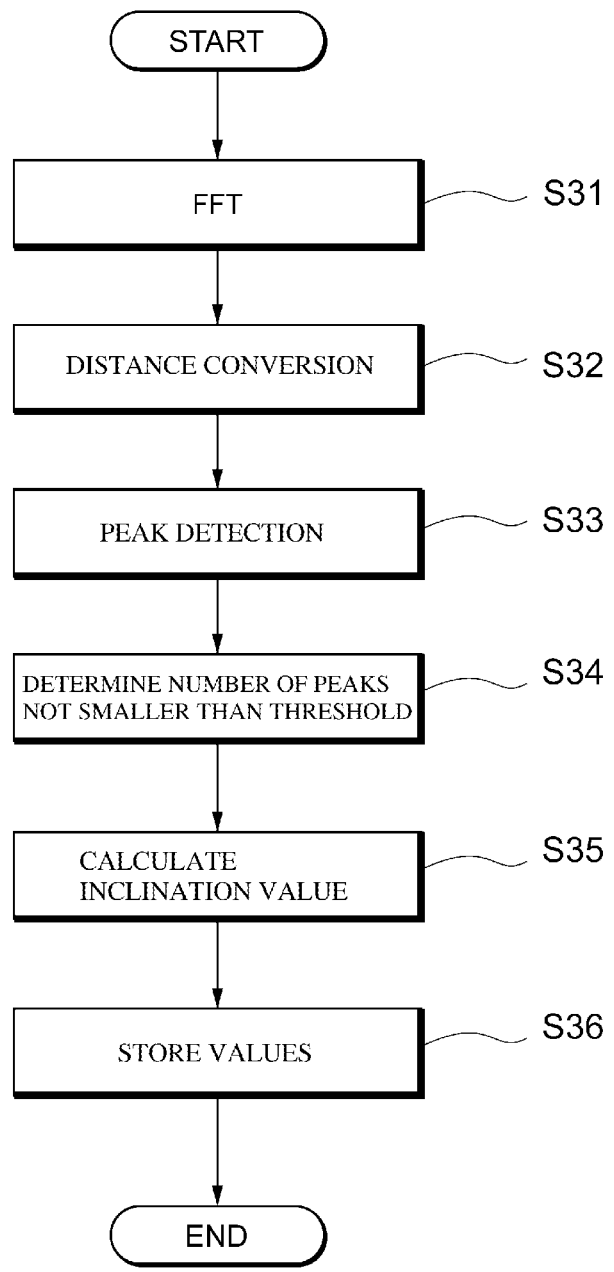
FIG. 8 is a flowchart illustrating a method executed by a processing unit of a controller to calculate individual distance values of distances from respective interferometers to a measurement target T and compare calculated values to a predetermined threshold.

FIG. 8 is a flowchart illustrating a method executed by the processing unit 59 of the controller 30 to calculate the individual distance values of the distances from the respective interferometers a, b, and c to the measurement target T and compare the calculated values to a predetermined threshold. Here, the interferometers a, b, and c are interferometers corresponding to the respective collimating lenses 22a, 22b, and 22c. Note that the following description is based on the premise that the positions of the collimating lenses 22a to 22c in the optical axis direction are the same. However, in the displacement sensor 10 according to one or more embodiments, the positions of the collimating lenses 22a to 22c in the optical axis direction need not be the same. The method includes steps S31 to S36, as shown in FIG. 8. The method may be executed at each sampling time of the main interferometer.

Figure 9A:
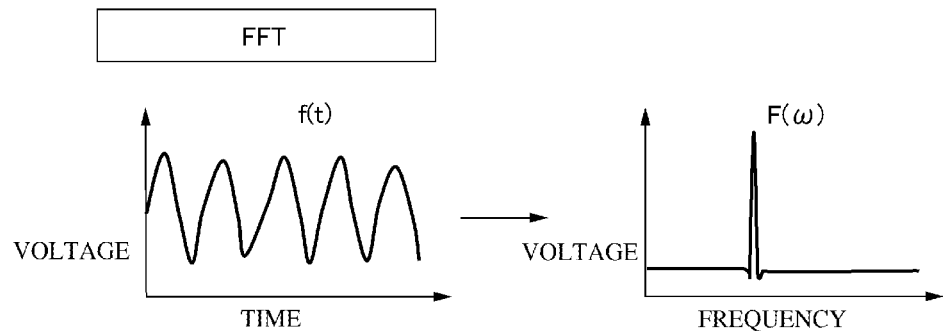
FIG. 9A a graph illustrating a conversion of a time domain signal (e.g., voltage vs time) to frequency spectrum (e.g., voltage vs frequency).

In step S31, the processing unit 59 performs an FFT such as is shown in EQ(1) below to frequency-convert the time domain signals (voltage vs time) corresponding to the interferometers a to c to a spectrum (voltage vs frequency). FIG. 9A shows how the time domain signal (voltage vs time) is frequency-converted to the spectrum (voltage vs frequency).

$$\sum_{t=0}^{N-1} f(t)\exp\left(-i\frac{2\pi\omega t}{N}\right) = F(\omega) \qquad \text{EQ(1)}$$

N: Number of data points

Figure 9B:
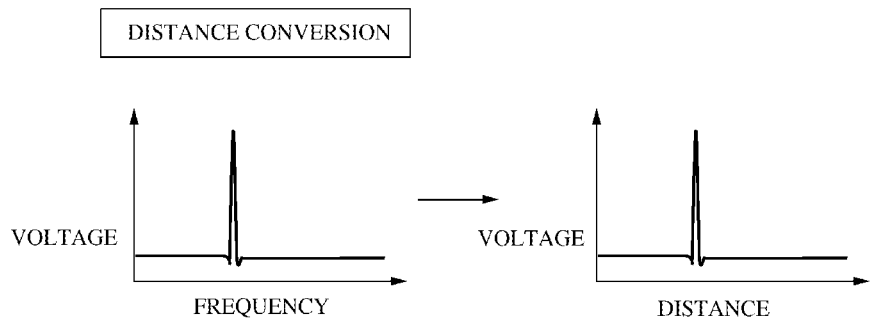
FIG. 9B a graph illustrating a conversion of a spectrum (e.g., voltage vs frequency) to distance spectrum (e.g., voltage vs distance).

In step S32, the processing unit 59 performs distance conversion on the spectra (voltage vs frequency) corresponding to the respective interferometers a to c into respective spectra (voltage vs distance). FIG. 9B shows how a spectrum (voltage vs frequency) corresponding to each of the interferometers a to c is subjected to distance conversion into a spectrum (voltage vs distance).

Figure 9C:
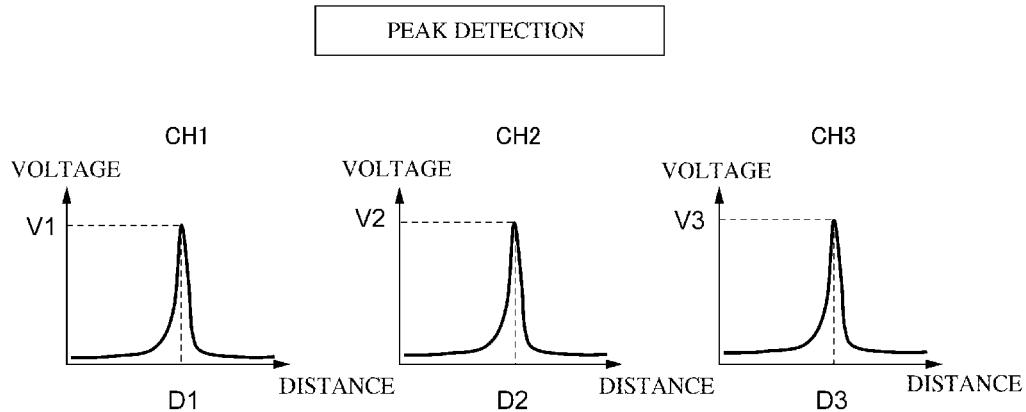
FIG. 9C a graph illustrating peak detection based on a spectrum (e.g., voltage vs distance), and corresponding distance values are calculated.

In step S33, the processing unit 59 calculates individual distance values corresponding to peaks based on the spectrum (voltage vs distance) corresponding to each of the interferometers a to c. FIG. 9C shows how the peaks are detected based on the spectra (voltage vs distance) of the respective interferometers a to c, and corresponding individual distance values are calculated. Here, as shown in FIG. 9C, peaks are detected in the three channels based on the spectra (voltage vs distance) corresponding to the respective interferometers a to c, and individual distance values (D1, D2, and D3 in the example in FIG. 9C) corresponding to the peaks are calculated.

In step S34, the processing unit 59 compares peak voltage values (SN values; voltages V1, V2, and V3 in the example in FIG. 9C) corresponding to the respective interferometers a to c detected in step S33 to a predetermined threshold (an example of a first threshold), and then determines the number of peaks not smaller than the threshold. Here, the predetermined threshold may be a predefined constant. Alternatively, the predetermined threshold may be a value calculated based on the SN values corresponding to the respective interferometers a to c. Specifically, the predetermined threshold may be, for example, a value obtained by multiplying the largest value of the SN values corresponding to the respective interferometers a to c by a predetermined proportion. The proportion may be set in any manner, and may be, for example, 0.8, 0.5, 0.3, or the like. For example, if sNa, which is the SN value corresponding to the interferometer a, is 100, SNb, which is the SN value corresponding to the interferometer b, is 80, and SNc, which is the SN value corresponding to the interferometer c, is 40, the largest SN value is 100 for sNa. If the predetermined proportion is 0.5, the value obtained by multiplying 100 for sNa, i.e., the largest SN value by 0.5 is 50. Thus, the aforementioned threshold is 50. Since sNa (100) and SNb (80) are not smaller than the threshold (50) while the SNc (40) is smaller than the threshold (50), it is determined that the number of peaks that are not smaller than the threshold is 2.

In step S35, the processing unit 59 calculates an inclination value. Here, the inclination value may be a correction factor for the individual distance values for reducing the influence of the inclination between the sensor head 20 and the measurement target T.

Figure 10A:
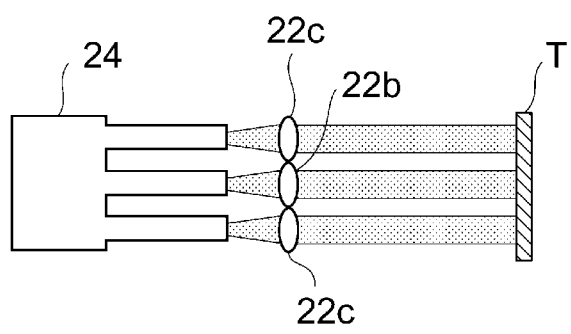
FIG. 10A is a diagram illustrating an inclination between a sensor head and a measurement target T.
Figure 10A:
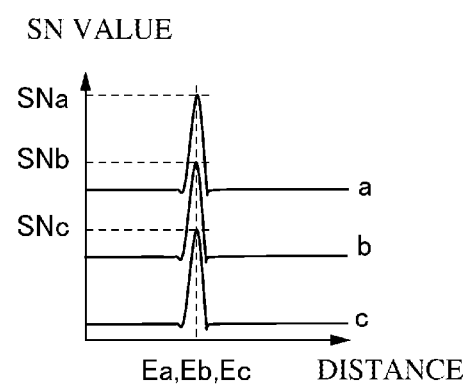

Inclination between the sensor head 20 and the measurement target T will be described with reference to FIGS. 10A and 10B. FIG. 10A shows, on the left side, the optical fiber array 24 and the collimating lenses 22a to 22c of the displacement sensor 10 and the measurement target T when the measurement target T is not inclined relative to the sensor head 20 (when the interferometers a to c are parallel to the measurement target T). Note that other components of the displacement sensor 10, such as the objective lens 21, are omitted for convenience. Also, FIG. 10A schematically shows, on the right side, a graph illustrating the relationship between the SN values (signal intensities) and the individual distance values corresponding to the respective interferometers a to c. In FIG. 10A, sign a denotes the SN value corresponding to the interferometer a, sign b denotes the SN value corresponding to the interferometer b, and sign c denotes the SN value corresponding to the interferometer c. Further, sNa denotes the peak of the SN value corresponding to the interferometer a, SNb denotes the peak of the SN value corresponding to the interferometer b, and SNc denotes the peak of the SN value corresponding to the interferometer c.

Figure 10B:
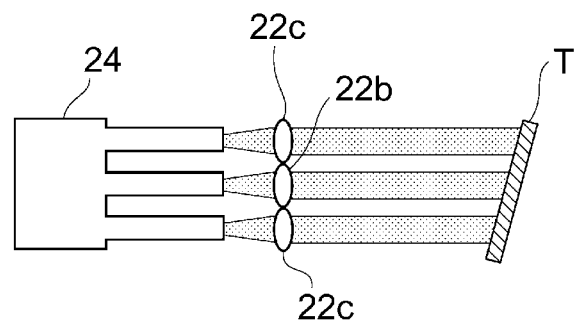
FIG. 10B is a diagram illustrating an inclination between a sensor head and a measurement target T.
Figure 10B:
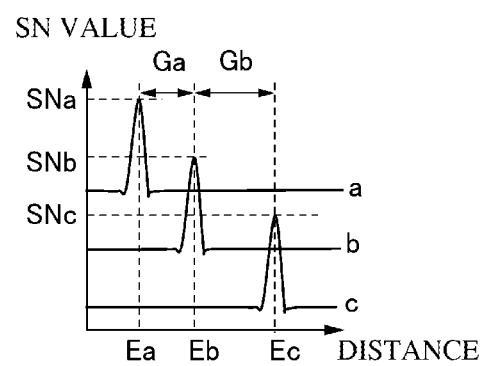

FIG. 10B shows, on the left side, the optical fiber array 24 and the collimating lenses 22a to 22c of the displacement sensor 10 and the measurement target T when the measurement target T is inclined relative to the sensor head 20 (when the interferometers a to c are not parallel to the measurement target T). Note that other components of the displacement sensor 10, such as the objective lens 21, are omitted for convenience. Also, FIG. 10B schematically shows, on the right side, a graph of the SN values (signal intensities) and the individual distance values corresponding to the respective interferometers a to c. In FIG. 10B, "a" denotes the SN value corresponding to the interferometer a, "b" denotes the SN value corresponding to the interferometer b, and "c" denotes the SN value corresponding to the interferometer c. Further, sNa denotes the peak of the SN value corresponding to the interferometer a, SNb denotes the peak of the SN value corresponding to the interferometer b, and SNc denotes the peak of the SN value corresponding to the interferometer c.

As shown on the right side of FIG. 10A, the individual distance values Ea, Eb, and Ec corresponding to the respective interferometers a, b, and c are substantially the same values, which corresponds to the measurement target T not being inclined relative to the sensor head 20, as shown on the left side of FIG. 10A. Note that the individual distance values Ea, Eb, and Ec are not necessarily the same when the positions of the collimating lenses 22a to 22c in the optical axis direction are not the same. On the other hand, the individual distance value Ea corresponding to the interferometer a, the individual distance value Eb corresponding to the interferometer b, and the individual distance value Ec corresponding to the interferometer c satisfy the relationship Ea<Eb<Ec, as shown on the right side of FIG. 10B, which corresponds to the measurement target T being inclined relative to the sensor head 20, as shown on the left side of FIG. 10B. Note that the individual distance values Ea, Eb, and Ec do not necessarily satisfy the relationship Ea<Eb<Ec when the positions of the collimating lenses 22a to 22c in the optical axis direction are not the same.

Next, the inclination value calculated by the processing unit 59 will be explained. The inclination value may be calculated based on at least a difference between the individual distance values corresponding to two of the plurality of interferometers of the sensor head 20. In the case of the example shown in FIG. 10B, the inclination value may be calculated as Ga=Eb−Ea, based on the individual distance value Ea corresponding to the interferometer a and the individual distance value Eb corresponding to the interferometer b. Also, the inclination value may alternatively be calculated as Gb=Ec−Eb, based on the individual distance value Eb corresponding to the interferometer b and the individual distance value Ec corresponding to the interferometer c. Further, the inclination value may alternatively be calculated as a value obtained by dividing a difference between the individual distance values corresponding to two of the plurality of interferometers of the sensor head 20 by an indicator that is indicative of the degree of separation between these two interferometers. The indicator that is Indicative of the degree of separation between the two interferometers may be, for example, the number of interferometers arranged between the two interferometers, or the number obtained by adding 1 to this number. Accordingly, given that these two interferometers are the interferometers a and c in the example shown in FIG. 10B, one interferometer b is arranged between the interferometers a and c. Accordingly, the inclination value may be calculated as a value obtained by dividing a difference between the individual distance value Ea corresponding to the interferometer a and the individual distance value Ec corresponding to the interferometer c by 2, which is the number obtained by adding 1 to the number (1) of interferometers (interferometer b) arranged between the interferometers a and c, that is, Gc=(Ec−Ea)/2. Alternatively, the indicator indicative of the degree of separation between two interferometers may be, for example, the distance between the two interferometers, which may be, for example, a distance in a direction perpendicular to the optical axis. Specifically, the distance may be a distance between collimating lenses in the direction perpendicular to the optical axis. In particular, if the indicator that is indicative of the degree of separation between two interferometers is thus expressed by the distance between the two interferometers, the inclination value, i.e., the value obtained by dividing a difference between the individual distance values corresponding to the two respective interferometers by the indicator corresponds to the angle of inclination between the sensor head 20 and the measurement target T.

Returning to FIG. 8, in step S36, the processing unit 59 registers various values related to the individual distance values calculated in step S33 in a table, such as that shown as an example in FIG. 11, stored in a predetermined storage unit in association with sampling time. The table may include, for example, the individual distance values calculated in step S33, as shown in FIG. 11. Although d1, d2, and similar values are shown as individual distance values in FIG. 11 for convenience, these values may include the individual distance values corresponding to the respective interferometers. The table may also include, for example, the number of peaks not smaller than the predetermined threshold that is calculated in step S34, as shown in FIG. 11. The table may also include, for example, the inclination value calculated in step S35, as shown in FIG. 11.

Figure 12:
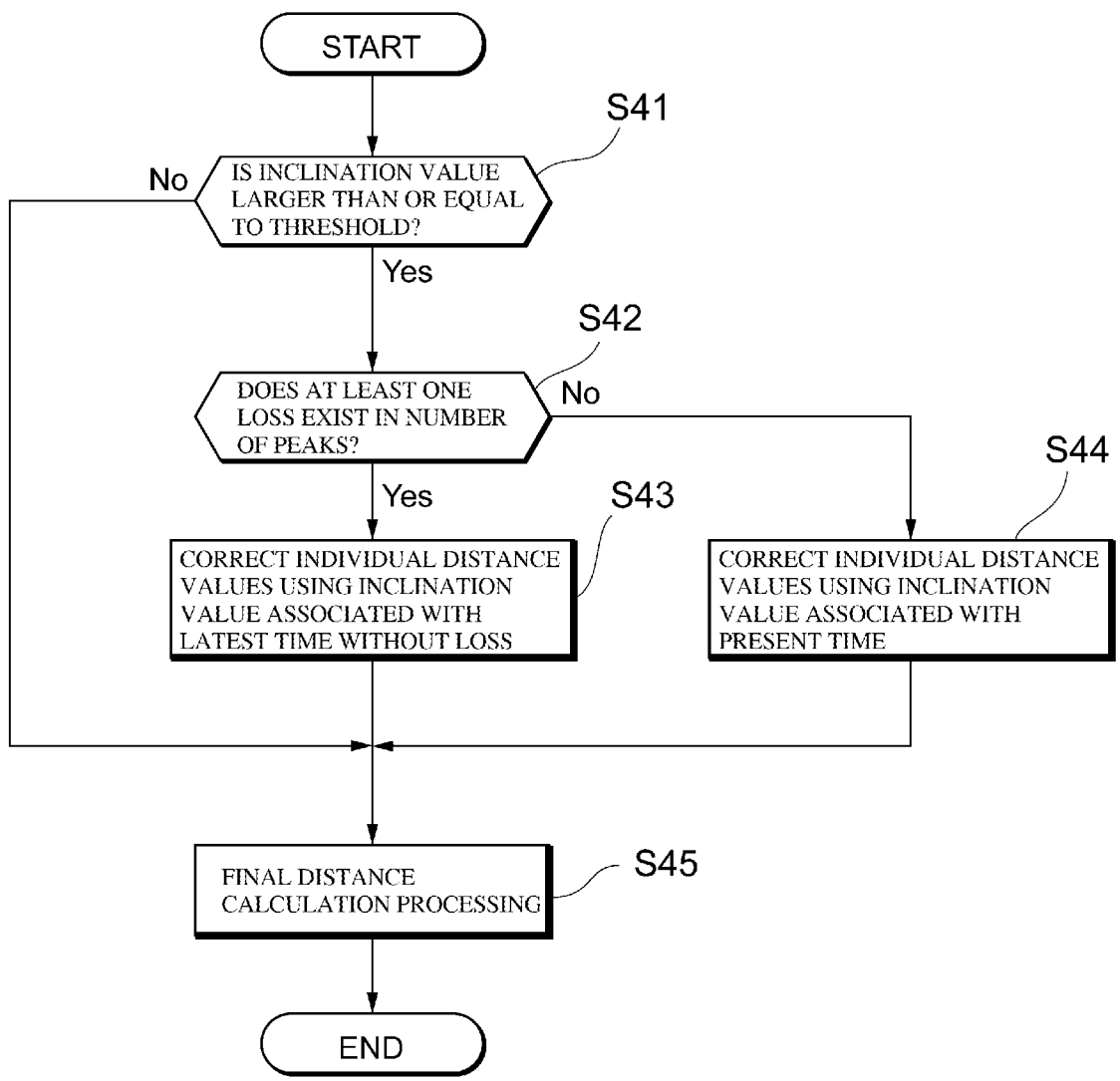
FIG. 12 is a flowchart illustrating a method executed by a processing unit of a controller to calculate a final distance value of a distance from a displacement sensor to a measurement target T.

FIG. 12 is a flowchart showing a method executed by the processing unit 59 of the controller 30 to calculate a final distance value of the distance from the displacement sensor 10 to the measurement target T. The method includes steps S41 to S45, as shown in FIG. 12. For example, the method may be executed at each sampling time of the main interferometer.

In step S41, the processing unit 59 references the table shown in FIG. 11 to retrieve an inclination value associated with the relevant sampling time, and determines whether or not the inclination value is larger than or equal to a predetermined threshold by comparing the inclination value to the threshold. If a plurality of inclination values exist, the processing unit 59 may compare all of the inclination values to the threshold, or may compare only some of the inclination values to the threshold. In the case of the example shown in FIG. 10B, the processing unit 59 may compare the inclination value Ga (the difference between the individual distance values Eb and Ea) to a threshold C, or may compare, in addition to or instead of the comparison, the inclination value Gb (the difference between the individual distance values Ec and Eb) to the threshold C.

If it is determined in step S41 that the inclination value is not larger than or equal to the threshold (S41; No), the processing proceeds to step S45. On the other hand, if it is determined in step S41 that the inclination value is larger than or equal to the threshold, (S41; Yes), the processing proceeds to step S42.

In step S42, the processing unit 59 determines whether or not at least one loss exists in the number of peaks associated with the relevant time. That is, the processing unit 59 references the table shown in FIG. 11 to retrieve the number of peaks not smaller than the threshold associated with that time, and determines whether or not at least one loss exists in the number of peaks. In the case of the example shown in FIG. 10B, the number of complete peaks with no loss is 3. Accordingly, if the number of peaks associated with that time is two or less in the table in FIG. 11, the processing unit 59 determines that at least one loss exists in the number of peaks. If it is determined in step S42 that at least one loss exists in the number of peaks associated with the time (S42; Yes), the processing proceeds to step S43. On the other hand, if it is determined in step S42 that at least one loss does not exist in the number of peaks associated with the time (S42; No), the processing proceeds to step S44.

In step S43, the processing unit 59 corrects the individual distance values using the inclination value associated with the latest time with no loss. Here, the latest time with no loss may be a time with no loss in the number of peaks and closest to the present, of the times preceding the relevant time. "Correcting the individual distance value" means performing a calculation on the individual distance values based on the inclination value, and may include, for example, adding the inclination value to the individual distance values. In the case of the example shown in FIG. 10B, for example, da denotes the corrected individual distance value for the interferometer a, db denotes the corrected individual distance value for the interferometer b, and ca denotes the corrected individual distance value for the interferometer c. Here, for example, a correction may be performed such that da=Ea+G, db=Eb, and dc=Ec−G, for example. Note that these formulas for correction are examples, and the correction may be performed using other calculation formulas.

In step S44, the processing unit 59 corrects the individual distance values using the inclination value associated with the present time.
The method for calculating the individual distance values may be the same as that in step S43.

In step S45, the processing unit 59 calculates the final distance value of the distance from the displacement sensor 10 to the measurement target T. For example, the final distance value may be calculated based on the individual distance values after being corrected in step S43 or S44. In particular, the final distance value may be a mean value of the individual distance values or a mean value of individual distance values not smaller than the predetermined threshold. Alternatively, the final distance value may be the individual distance value calculated from a signal with the strongest signal intensity. Note that the processing unit 59 displays the final distance value as the result of measurement processing in the display unit 31 and/or outputs the final distance value to the control device 11, the externally connected device 13, or the like via the external I/F unit 33, as described above regarding step S24. Further, the processing unit 59 may also display the inclination value calculated in the aforementioned step S35 in the display unit 31 and/or output the inclination value to the control device 11, the externally connected device 13, or the like via the external I/F unit 33.

Note that, in the example shown in FIG. 11, it is determined in step S42 whether or not at least one loss exists in the number of peaks. However, the number of losses in the number of peaks determined in step S42 is not limited to at least one, and may also be at least two or at least three, for example.

First Variation of Interferometer

Figure 13:
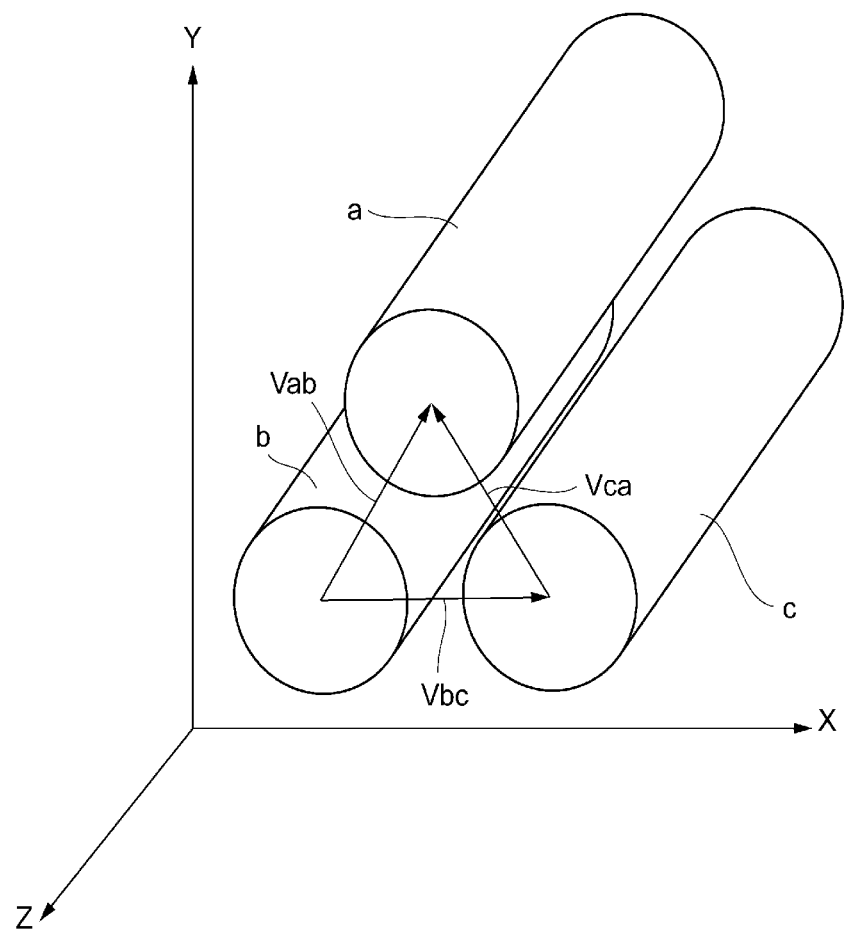
FIG. 13 is a diagram illustrating a first variation of an interferometer.

The plurality of interferometers included in the optical interference range sensor 100 may be arranged such that the heads of the interferometers are arranged at positions that are in the same plane but not on the same straight line. In other words, the plurality of interferometers included in the optical interference range sensor 100 may include three interferometers whose heads form a substantially triangular shape in a plane. For example, FIG. 13 shows these three interferometers a, b, and c that are included the optical interference range sensor 100. Head portions of the interferometers a, b, and c are arranged in the same XY plane, as shown in FIG. 13. Further, the measurement target is assumed to have a face parallel to an XY plane. Here, it is assumed that the axial direction of the inclination of the measurement target is the X-axis direction, i.e., the measurement target is inclined about the X axis by a predetermined angle. Accordingly, since the interferometers b and c are at the same positions in the Y-axis direction, the individual distance values corresponding to the respective interferometers b and c change substantially by the same value due to the inclination. Meanwhile, the position of the interferometer a in the Y-axis direction is different from the positions of the interferometers b and c in the Y-axis direction, so that the individual distance value corresponding to the interferometer a changes by a value different from those of the individual distance values corresponding to the interferometers b and c, due to the inclination.

Based on the above-described premise, the processing unit 59 may select two interferometers with which the difference between the direction of a vector formed by starting points of the two interferometers and the direction of the inclination of the measurement target is closest to a right angle, and calculate the inclination value based at least on the individual distance values corresponding to the two selected interferometers. For example, the example in FIG. 13 shows a vector Vab connecting the starting point of the interferometer a to the starting point of the interferometer b, a vector Vbc connecting the starting point of the interferometer b to the starting point of the interferometer c, and a vector Vca connecting the starting point of the interferometer c to the starting point of the interferometer a. Here, the difference between the direction of the vector Vab or the vector Vca, of the vectors Vab, Vbc, and Vca, and the X-axis direction, which is the direction of the inclination of the measurement target, is closest to a right angle. Accordingly, the processing unit 59 may select the interferometers a and b corresponding to the vector Vab and calculate the inclination value based at least on the individual distance values corresponding to the selected interferometers a and b.

Alternatively, the processing unit 59 may select the interferometers c and a corresponding to the vector Vca and calculate the inclination value based at least on the individual distance values corresponding to the selected interferometers c and a.

Second Variation of Interferometer

The optical interference range sensor 100 in the above embodiment or embodiments use a Fizeau interferometer that generates a reference beam by using the leading end of the optical fiber cable as a reference surface in each of the interferometers 130a to 130c. However, the interferometer is not limited thereto.

Figure 14A:
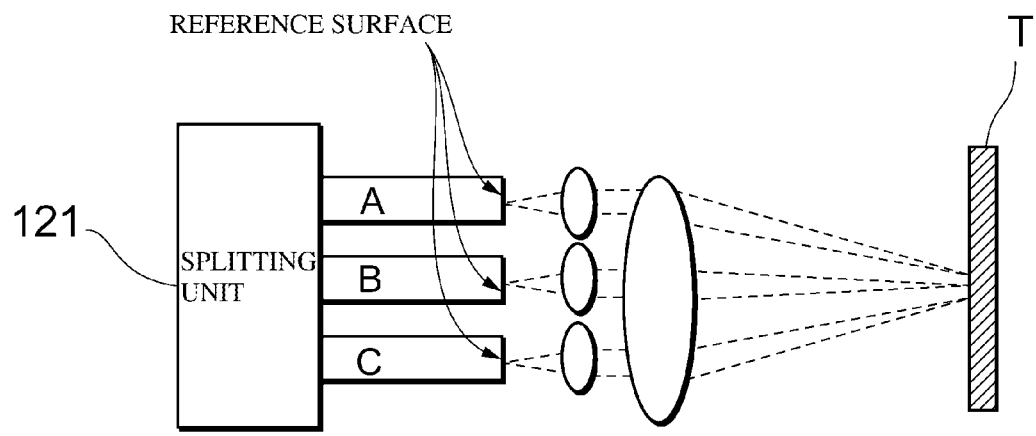
FIGS. 14A, 14B and 14C are diagrams each illustrating second variations of an interferometer.
Figure 14B:
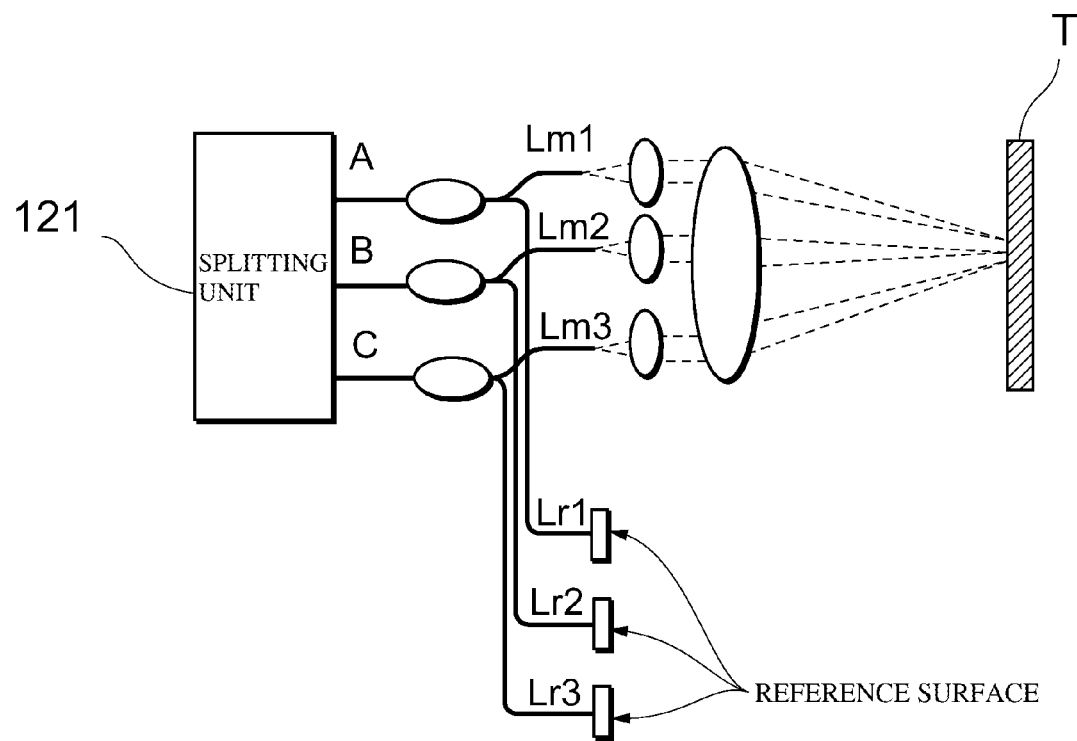
Figure 14C:
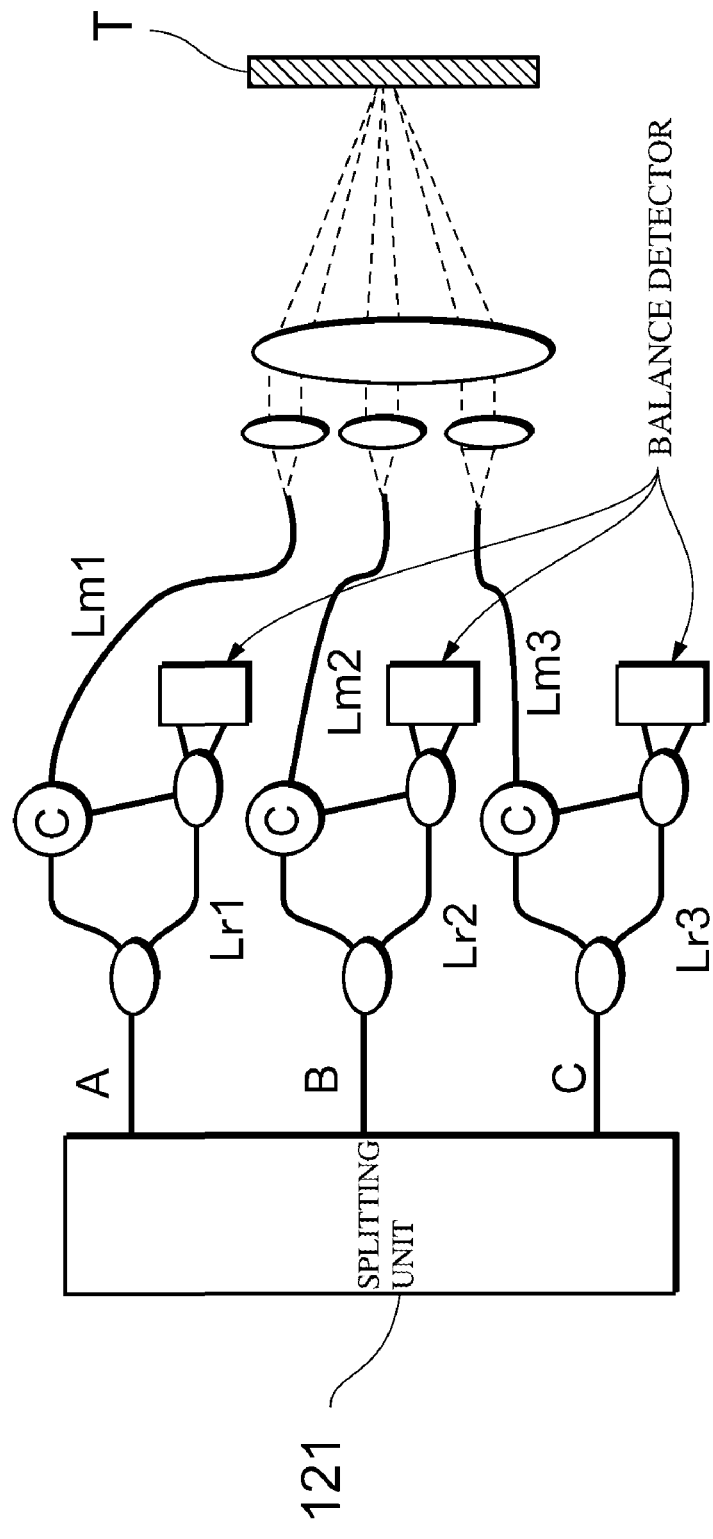

FIGS. 14A to 14C show variations of interferometers that generate an interference beam using a measurement beam and a reference beam. In FIG. 14A, interference beams are generated based on the optical path length differences between the reference beams reflected at the reference surfaces that are the leading ends of the respective optical fiber cables in the optical paths A to C split by the splitting unit 121 and the measurement beam radiated from the sensor head and reflected at the measurement target T, which amounts to the configuration of the interferometers 130a to 130c (Fizeau interferometer) of the optical interference range sensor 100 according to the above embodiment or embodiments. The reference surface may alternatively be configured so that a light beam is reflected due to a difference in refractive index between the optical fiber cable and the air (Fresnel reflection). In addition, the leading end of each optical fiber may also be coated with a reflective film. Alternatively, a configuration may also be employed in which a non-reflective coating is applied to the leading end of each optical fiber, and a reflective surface, such as a lens surface, is arranged separately.

In FIG. 14B, measurement optical paths Lm1 to Lm3 for guiding measurement beams to the measurement target T and reference optical paths Lr1 to Lr3 for guiding reference beams are formed in the optical paths A to C split by the splitting unit 121. Reference surfaces are arranged at leading ends of the reference optical paths Lr1 to Lr3 (Michelson interferometer). The reference surfaces may be obtained by coating the leading ends of the optical fiber cables with reflective films, or may be obtained by applying non-reflective coating to the leading ends of the optical fibers and separately arranging mirrors or the like. In the above-described configuration, interference beams are generated in the optical paths A to C by providing optical path length differences between the optical path lengths of the measurement optical paths Lm1 to Lm3 and the optical path lengths of the reference optical paths Lr1 to Lr3.

In FIG. 14C, measurement optical paths Lm1 to Lm3 for guiding measurement beams to the measurement target T and reference optical paths Lr1 to Lr3 for guiding reference beams are formed in the optical paths A to C split by the splitting unit 121. Balance detectors are arranged in the reference optical paths Lr1 to Lr3 (Mach-Zehnder interferometer). In the above-described configuration, interference beams are generated in the optical paths A to C by providing optical path length differences between the optical path lengths of the measurement optical paths Lm1 to Lm3 and the optical path lengths of the reference optical paths Lr1 to Lr3.

Thus, the interferometer is not limited to the Fizeau interferometer described in one or more embodiments above, and may be, for example, a Michelson interferometer or a Mach-Zehnder interferometer. Any type of interferometer may be applied, or a combination of those interferometers or any other configuration may be applied if an interference beam may be generated by setting the optical path length difference between a measurement beam and a reference beam.

The above-described embodiment or embodiments are for facilitating understanding one or more embodiments, and are not for interpreting one or more embodiments in a limiting manner. The elements provided by one or more embodiments, and the arrangements, materials, conditions, shapes, sizes, and the like of these elements are not limited to those described as examples, and may be modified as appropriate. The configurations described in different embodiments may be partially replaced or combined.

LIST OF REFERENCE NUMERALS

1 Sensor system
10 Displacement sensor
11 Control device
12 Control signal input sensor
13 Externally connected device
20 Sensor head
21 Objective lens
22a to 22c Collimating lens
23 Lens holder
24 Optical fiber array
30 Controller
31 Display unit
32 Setting unit
33 External interface (I/F) unit
34 Optical fiber cable connector
35 External storage unit
36 Measurement processing unit
40 Optical fiber cable
51 Wavelength-swept light source
52 Optical amplifier
53, 53a to 53b Isolator
54, 54a to 54e Optical coupler
55 Attenuator
56a to 56c Light-receiving element
58 AD conversion unit
59 Processing unit
60 Balance detector
61 Correction signal generation unit
71a to 71e Light-receiving element
72a to 72c Amplifier circuit
74a to 74c AD conversion unit
75 Processing unit
76 Differential amplifier circuit
77 Correction signal generation unit
T Measurement target
Lm1 to Lm3 Measurement optical path
Lr1 to Lr3 Reference optical path

The invention claimed is:

1. An optical interference range sensor comprising:
a light source configured to project a light beam while continuously varying its wavelength;
a plurality of interferometers to which the light beam projected from the light source is supplied, each of the plurality of interferometers being configured to generate an interference beam by interference between a measurement beam that is a light beam radiated toward a measurement target and reflected from the measurement target and a reference beam passing through an optical path that is at least partially different from an optical path of the measurement beam;
a light-receiving unit comprising one or more photodetectors and a circuit configured to receive interference beams generated by the plurality of interferometers and convert the received interference beams into a plurality of electrical signals corresponding to the respective interferometers; and
a processing unit comprising a processor or a processing circuit configured to perform operations comprising:
calculating a distance from the optical interference range sensor to the measurement target based on at least one first electrical signal whose intensity is not smaller than a first threshold, of the plurality of electrical signals, and output the calculated distance;
converting the at least one first electrical signal to a first distance value indicating a distance to the measurement target from the interferometer corresponding to that first electrical signal;
calculating, based on the first distance value, an inclination value indicating inclination of the plurality of interferometers relative to the measurement target;
referencing a storage unit that sequentially stores a number of times that the first electrical signal is detected, the first distance value, and the inclination value in association with each other, and correcting the first distance value based on the inclination value; and calculating a second distance value indicating the distance from the optical interference range sensor to the measurement target based on the corrected first distance value, wherein if the number of times that the first electrical signal is detected among the plurality of electrical signals is smaller than a second threshold, the first distance value is corrected based on an inclination value that precedes the inclination value associated with the first distance value in the storage unit.

2. The optical interference range sensor according to claim 1,
wherein the first threshold is a value obtained by multiplying the largest intensity out of intensities of the plurality of electrical signals by a predetermined proportion.

3. The optical interference range sensor according to claim 1,
wherein the processing unit is configured to perform operations such that correcting the first distance value comprises correcting the first distance value if the inclination value satisfies a predetermined condition.

4. The optical interference range sensor according to claim 3,
wherein the predetermined condition comprises at least one inclination value that is not smaller than a third threshold.

5. The optical interference range sensor according to claim 1,
wherein the processing unit is configured to perform operations such that, if the number of times that the first electrical signal is detected among the plurality of electrical signals is smaller than the second threshold, correcting the first distance value comprises correcting the first distance value based on an inclination value associated with a time when the number of times that the first electrical signal is detected is not smaller than a fourth threshold in the storage unit.

6. The optical interference range sensor according to claim 1,
wherein the processing unit is configured to perform operations further comprising outputting the inclination value.

7. The optical interference range sensor according to claim 1,
wherein the processing unit is configured to perform operations such that calculating the inclination value comprises calculating, as the inclination value, a value obtained by dividing a difference between first distance values corresponding to two interferometers out of the plurality of interferometers by a number obtained by adding one to the number of interferometers arranged between the two interferometers.

8. The optical interference range sensor according to claim 1, wherein
the plurality of interferometers comprise at least three interferometers arranged such that heads of the at least three interferometers form a substantially triangular shape in a plane, and
the processing unit is configured to perform operations such that calculating the inclination value comprises selecting two interferometers from interferometers corresponding to electrical signals each having an intensity not smaller than the first threshold such that a difference between a direction of a vector formed by starting points of the two interferometers, of the three interferometers, and an axial direction of inclination of the measurement target is closest to a right angle, and
calculating the inclination value based at least on the first distance value corresponding to each of the two selected interferometers.

9. The optical interference range sensor according to claim 2,
wherein the processing unit is configured to perform operations such that correcting the first distance value comprises correcting the first distance value if the inclination value satisfies a predetermined condition.

10. The optical interference range sensor according to claim 2,
wherein the processing unit is configured to perform operations such that, if the number of times that the first electrical signal is detected among the plurality of electrical signals is smaller than the second threshold, correcting the first distance value comprises correcting the first distance value based on an inclination value associated with a time when the number of times that the first electrical signal is detected is not smaller than a fourth threshold in the storage unit.

11. The optical interference range sensor according to claim 3,
wherein the processing unit is configured to perform operations such that, if the number of times that the first electrical signal is detected among the plurality of electrical signals is smaller than the second threshold, correcting the first distance value comprises correcting the first distance value based on an inclination value associated with a time when the number of times that the first electrical signal is detected is not smaller than a fourth threshold in the storage unit.

12. The optical interference range sensor according to claim 4,
wherein the processing unit is configured to perform operations such that, if the number of times that the first electrical signal is detected among the plurality of electrical signals is smaller than the second threshold, correcting the first distance value comprises correcting the first distance value based on an inclination value associated with a time when the number of times that the first electrical signal is detected is not smaller than a fourth threshold in the storage unit.

13. The optical interference range sensor according to claim 2,
wherein the processing unit is configured to perform operations further comprising outputting the inclination value.

14. The optical interference range sensor according to claim 3,
wherein the processing unit is configured to perform operations further comprising outputting the inclination value.

15. The optical interference range sensor according to claim 4,
wherein the processing unit is configured to perform operations further comprising outputting the inclination value.

16. The optical interference range sensor according to claim 5,
wherein the processing unit is configured to perform operations further comprising outputting the inclination value.

17. The optical interference range sensor according to claim 2,
   wherein the processing unit is configured to perform operations such that calculating the inclination value comprises calculating, as the inclination value, a value obtained by dividing a difference between first distance values corresponding to two interferometers out of the plurality of interferometers by a number obtained by adding one to the number of interferometers arranged between the two interferometers.

18. The optical interference range sensor according to claim 3,
   wherein the processing unit is configured to perform operations such that calculating the inclination value comprises calculating, as the inclination value, a value obtained by dividing a difference between first distance values corresponding to two interferometers out of the plurality of interferometers by a number obtained by adding one to the number of interferometers arranged between the two interferometers.

19. The optical interference range sensor according to claim 4,
   wherein the processing unit is configured to perform operations such that calculating the inclination value comprises calculating, as the inclination value, a value obtained by dividing a difference between first distance values corresponding to two interferometers out of the plurality of interferometers by a number obtained by adding one to the number of interferometers arranged between the two interferometers.

20. The optical interference range sensor according to claim 5,
   wherein the processing unit is configured to perform operations such that calculating the inclination value calculating, as the inclination value, a value obtained by dividing a difference between first distance values corresponding to two interferometers out of the plurality of interferometers by a number obtained by adding one to the number of interferometers arranged between the two interferometers.

* * * * *

UNITED STATES PATENT AND TRADEMARK OFFICE
CERTIFICATE OF CORRECTION

Page 1 of 1

PATENT NO. : 12,298,117 B2
APPLICATION NO. : 18/172689
DATED : May 13, 2025
INVENTOR(S) : Yusuke Nagasaki et al.

It is certified that error appears in the above-identified patent and that said Letters Patent is hereby corrected as shown below:

On the Title Page

Foreign Application Priority Data should be inserted as shown below:
--(30) Foreign Application Priority Data
March 11, 2022 (JP).................................. 2022-38181--

Signed and Sealed this
Fifteenth Day of July, 2025

Coke Morgan Stewart
*Acting Director of the United States Patent and Trademark Office*